(12) United States Patent
Suetsugu et al.

(10) Patent No.: US 7,827,351 B2
(45) Date of Patent: Nov. 2, 2010

(54) STORAGE SYSTEM HAVING RAID LEVEL CHANGING FUNCTION

(75) Inventors: Michio Suetsugu, Odawara (JP); Yoshinori Okami, Odawara (JP); Takao Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 539 days.

(21) Appl. No.: 11/971,500

(22) Filed: Jan. 9, 2008

(65) Prior Publication Data
US 2009/0037656 A1 Feb. 5, 2009

(30) Foreign Application Priority Data
Jul. 31, 2007 (JP) ............................. 2007-199087

(51) Int. Cl.
*G06F 12/16* (2006.01)

(52) U.S. Cl. ................... 711/114; 711/165; 711/170

(58) Field of Classification Search .................. 711/114, 711/165, 170
See application file for complete search history.

(56) References Cited

U.S. PATENT DOCUMENTS 7,299,385 B2 * 11/2007 Voigt ........................... 714/57

FOREIGN PATENT DOCUMENTS

JP 2006-318017 11/2006

* cited by examiner

*Primary Examiner*—Jack A Lane
(74) *Attorney, Agent, or Firm*—Brundidge & Stanger, P.C.

(57) ABSTRACT

A plurality of storage devices, provided in a storage system, comprise not less than two member storage devices, which are storage devices provided as members of a RAID group, and a spare storage device, which is not a member of the RAID group. A controller, provided in the storage system, uses the spare storage device to carry out the changing of the RAID level of the RAID group from a first RAID level to a second RAID level.

18 Claims, 34 Drawing Sheets

FIG. 3A

3121 RAID LEVEL MANAGEMENT TABLE

| LDEV NO. | LDEV #0 | LDEV #1 | LDEV #2 |
|---|---|---|---|
| RAID LEVEL | RAID5 | RAID5 | RAID5 |
| DISK CONFIGURATION | 3D+1P | 3D+1P | 3D+1P |
| RAID LEVEL STATUS | ESTABLISHED | ESTABLISHED | ESTABLISHED |
| ... | ... | ... | ... |

FIG. 3B

3122 LDEV MANAGEMENT TABLE

| RG#0 | LDEV #0 | DISK #1 | DISK #2 | DISK #3 | DISK #4 |
|---|---|---|---|---|---|
| RG#0 | LDEV #1 | DISK #1 | DISK #2 | DISK #3 | DISK #4 |
| ... | | | | | ... |

FIG. 3C

3124 DISK MANAGEMENT TABLE

| DISK ID | DISK A | DISK B | DISK C | DISK E | DISK E |
|---|---|---|---|---|---|
| DISK NO. | DISK #1 | DISK #2 | DISK #3 | DISK #4 | SPARE 1 |
| DISK STATUS (ERROR RATE) | NORMAL (2) | NORMAL (2) | NORMAL (3) | NORMAL (3) | NORMAL (2) |
| ... | ... | ... | | ... | ... |

REPLACE WITH NEW DISK

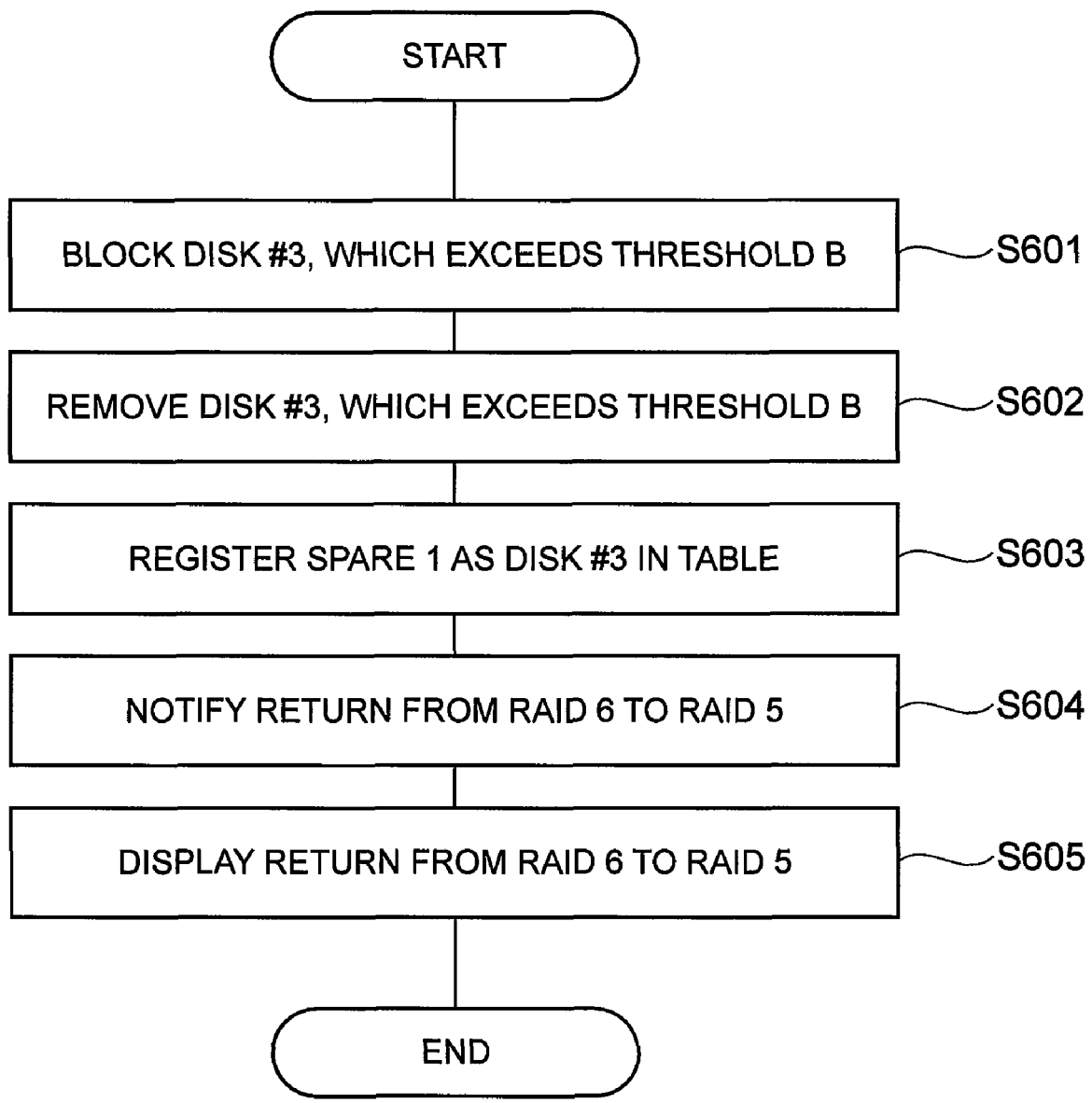

FIG. 21A

3121 RAID LEVEL MANAGEMENT TABLE

|  | LDEV #0 | LDEV #1 | LDEV #2 | ... |
|---|---|---|---|---|
| RAID LEVEL | RAID5 | RAID5 | RAID5 | ... |
| DISK CONFIGURATION | 3D+1P | 3D+1P | 3D+1P | ... |
| RAID LEVEL STATUS | RAID5-6 | RAID5-6 | RAID5-6 | ... |

FIG. 21B

3121 RAID LEVEL MANAGEMENT TABLE

|  | LDEV #0 | LDEV #1 | LDEV #2 | ... |
|---|---|---|---|---|
| RAID LEVEL | RAID6 | RAID6 | RAID6 | ... |
| DISK CONFIGURATION | 3D+1P+1Q | 3D+1P+1Q | 3D+1P+1Q | ... |
| RAID LEVEL STATUS | ESTABLISHED | ESTABLISHED | ESTABLISHED | ... |

FIG. 22A

3121 RAID LEVEL MANAGEMENT TABLE

|  | LDEV #0 | LDEV #1 | LDEV #2 | ... |
|---|---|---|---|---|
| RAID LEVEL | RAID6 | RAID6 | RAID6 | ... |
| DISK CONFIGURATION | 3D+1P+1Q | 3D+1P+1Q | 3D+1P+1Q | ... |
| RAID LEVEL STATUS | RAID6-5 | RAID6-5 | RAID6-5 | ... |

FIG. 22B

3121 RAID LEVEL MANAGEMENT TABLE

|  | LDEV #0 | LDEV #1 | LDEV #2 | ... |
|---|---|---|---|---|
| RAID LEVEL | RAID5 | RAID5 | RAID5 | ... |
| DISK CONFIGURATION | 3D+1P | 3D+1P | 3D+1P | ... |
| RAID LEVEL STATUS | ESTABLISHED | ESTABLISHED | ESTABLISHED | ... |

FIG. 23A

3122 LDEV MANAGEMENT TABLE

| RG#0 | LDEV #0 | DISK #1 | DISK #2 | DISK #3 | DISK #4 | SPARE 1 |
|---|---|---|---|---|---|---|
| RG#0 | LDEV #1 | DISK #1 | DISK #2 | DISK #3 | DISK #4 | SPARE 1 |
| ... | ... | ... | ... | ... | ... | ... |

FIG. 23B

3122 LDEV MANAGEMENT TABLE

| RG#0 | LDEV #0 | DISK #1 | DISK #2 | SPARE 2 | DISK #4 | SPARE 1 |
|---|---|---|---|---|---|---|
| RG#0 | LDEV #1 | DISK #1 | DISK #2 | SPARE 2 | DISK #4 | SPARE 1 |
| ... | ... | ... | ... | ... | ... | ... |

FIG. 24A

3124 DISK MANAGEMENT TABLE

| DISK ID | DISK A | DISK B | DISK C | DISK E | DISK E | ... |
|---|---|---|---|---|---|---|
| DISK NO. | DISK #1 | DISK #2 | DISK #3 | DISK #4 | SPARE 1 | ... |
| DISK STATUS (ERROR RATE) | NORMAL (2) | NORMAL (2) | THRESHOLD A_OVER (7) | NORMAL (3) | NORMAL (2) | ... |

FIG. 24B

3124 DISK MANAGEMENT TABLE

| DISK ID | DISK A | DISK B | DISK C | DISK E | DISK E | ... |
|---|---|---|---|---|---|---|
| DISK NO. | DISK #1 | DISK #2 | DISK #3 | DISK #4 | SPARE 1 | ... |
| DISK STATUS (ERROR RATE) | NORMAL (2) | NORMAL (2) | THRESHOLD B_OVER (11) | NORMAL (3) | NORMAL (2) | ... |

FIG. 29A

MAINTENANCE SCREEN

RAID-UP PROCESS STARTED (USING SPARE 1)

RAID GROUP NO.: 0
LDEV NOS.: 0, 1, 2
DISK NOS.: 1, 2, 3, 4
RAID LEVEL: RAID 5 → RAID 6

PROGRESS: 0%

FIG. 29B

MAINTENANCE SCREEN

RAID-UP PROCESS STARTED (USING SPARE 1)

RAID GROUP NO.: 0
LDEV NOS.: 0, 1, 2
DISK NOS.: 1, 2, 3, 4
RAID LEVEL: RAID 5 → RAID 6

PROGRESS: 15%

FIG. 29C

MAINTENANCE SCREEN

RAID-UP PROCESS ENDED (BELOW RAID GROUP TEMPORARILY RAID 6)

RAID GROUP NO.: 0
LDEV NOS.: 0, 1, 2
DISK NOS.: 1, 2, 3, 4, SPARE 1
RAID LEVEL: RAID 6

PROGRESS: 100%

STORAGE SYSTEM HAVING RAID LEVEL CHANGING FUNCTION

CROSS-REFERENCE TO PRIOR APPLICATION

This application relates to and claims the benefit of priority from Japanese Patent Application No. 2007-199087 filed on Jul. 31, 2007, the entire disclosure of which is incorporated herein by reference.

BACKGROUND

The present invention generally relates to a storage system having a RAID group.

In technology called RAID (Redundant Array of Independent (or Inexpensive) Disks), a RAID group, which stores data in an arbitrary RAID level (for example, RAID 5, RAID 6), is constructed. The RAID group is constituted from an arbitrary number of physical storage devices.

Technology for changing a RAID level is known. This type of technology, for example, is disclosed in Japanese Patent Laid-open No. 2006-318017. According to Japanese Patent Laid-open No. 2006-318017, an array group (equivalent to a RAID group), which is made up of an arbitrary number of disks, is divided into a plurality of redundancy groups. At least one redundancy group in each array group is treated as an unused redundancy group. When the RAID type (equivalent to a RAID level) is changed in one array group, the RAID type is changed for each redundancy group related to the change-targeted RAID type by moving the data stored in a redundancy group to the unused redundancy group, and changing the source redundancy group to the unused redundancy group.

According to Literature 1, the respective redundancy groups constituting a RAID group span all the disks, and at least one of the plurality of redundancy groups is treated as an unused redundancy group. Thus, even if an error is likely to occur on a certain disk in the RAID group, this error-susceptible disk can be made the data destination for a RAID level change.

SUMMARY

Therefore, an object of the present invention is to provide technology capable of changing a RAID level using a method other than one that provides and utilizes a free storage area in a RAID group.

Other objects of the present invention should become clear from the following explanation.

A plurality of storage devices, which is provided in a storage system, comprise not less than two member storage devices, which are storage devices provided as members of a RAID group, and a spare storage device, which is not a member of the RAID group. A controller, which is provided in the storage system, uses the spare storage device to change the RAID level of the RAID group from a first RAID level to a second RAID level.

BRIEF DESCRIPTION OF THE DRAWINGS

FIG. 3A shows an example of the constitution of a RAID level management table;

FIG. 3B shows an example of the constitution of a LDEV management table;

FIG. 3C shows an example of the constitution of a disk management table;

FIG. 12 is a flowchart of a process for returning to RAID 5 in the third embodiment;

FIG. 21A shows a RAID level management table of the first embodiment during a change from RAID 5 to RAID 6;

FIG. 21B shows a RAID level management table of the first embodiment subsequent to the end of the change from RAID 5 to RAID 6;

FIG. 22A shows a RAID level management table of the first embodiment during a change from RAID 6 to RAID 5;

FIG. 22B shows a RAID level management table of the first embodiment subsequent to the end of the change from RAID 6 to RAID 5;

FIG. 23A shows an LDEV management table of the first embodiment in which spare 1 has been temporarily added as a member of the RAID group;

FIG. 23B shows an LDEV management table of the first embodiment in which disk #3 has been replaced with spare 2;

FIG. 24A shows a disk management table of the first embodiment in which the error rate of disk #3 has exceeded threshold A;

FIG. 24B shows a disk management table of the first embodiment in which the error rate of disk #3 has exceeded threshold B;

FIG. 29A shows a maintenance screen at the start of a RAID-UP process;

FIG. 29B shows the maintenance screen during RAID-UP processing;

FIG. 29C shows the maintenance screen at the end of RAID-UP processing;

DETAILED DESCRIPTION OF THE PREFERRED EMBODIMENTS

Figure 1:
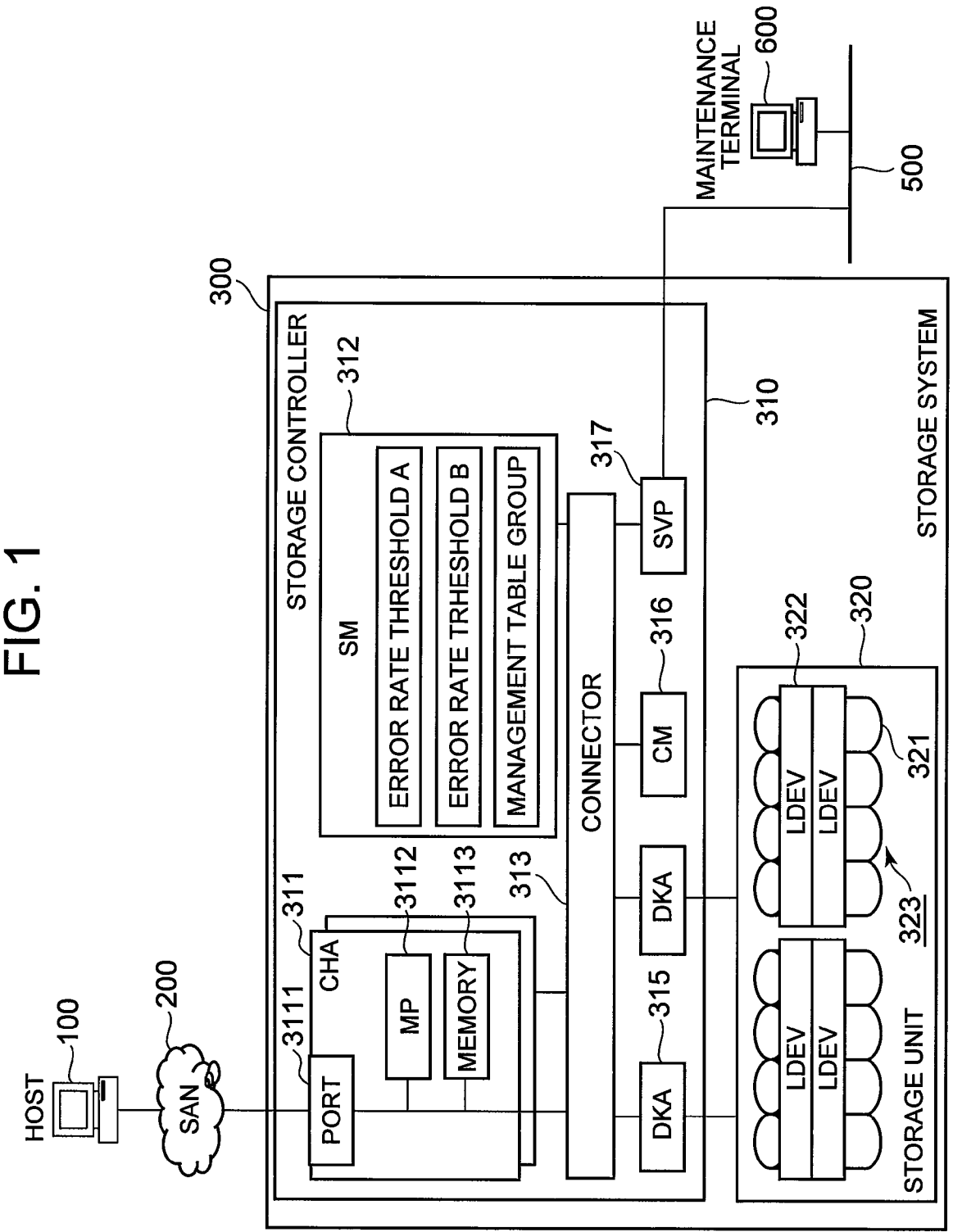
FIG. 1 shows the constitution of a computer system related to a first embodiment of the present invention.

In an embodiment 1, a storage system comprises a plurality of storage devices and a controller. The plurality of storage devices comprise not less than two member storage devices, which are storage devices provided as members of a RAID group, and either one or a plurality of spare storage devices, which are spare storage device that are not members of this RAID group. The controller changes the RAID level of the RAID group from a first RAID level to a second RAID level by using a spare storage device selected from the either one or plurality of spare storage devices.

In an embodiment 2 according to the embodiment 1, the second RAID level has higher fault tolerance than the first RAID level (for example, the second RAID level has a larger number of parities created per stripe than the first RAID level.). When the error rate of a certain member storage device of the not less than two member storage devices exceeds a first threshold, the controller changes the RAID level of the RAID group from the first RAID level to the second RAID level using the above-mentioned selected spare storage device.

In an embodiment 3 according to the embodiment 2, the constitution is such that when the error rate of a certain member storage device of the not less than two member storage devices exceeds a second threshold, the controller carries out an information backup process in which an information element stored in this certain member storage device is written to another spare storage device selected from a plurality of spare storage devices. In the embodiment 3, the first threshold is lower than the second threshold.

In an embodiment 4 according to the embodiment 3, the controller returns the RAID level of the RAID group from the second RAID level to the first RAID level subsequent to information backup processing.

In an embodiment 5 according to the embodiment 4, when the error rate of a member storage device other than the certain member storage device is not more than a prescribed rate, and/or when the error rates of the respective member storage devices are not more than a prescribed rate even after the passage of a fixed period of time, the controller returns the RAID level of the RAID group from the second RAID level to the above-mentioned first RAID level. In other words, the controller maintains the RAID level of the RAID group at the second RAID level in circumstances other than that.

In an embodiment 6 according to at least one of the embodiments 2 to 5, the second RAID level is a RAID level in which at least one parity is created for each stripe, which is a storage area constituting the RAID group. The controller writes an information element stored in a certain member storage device to the above-mentioned selected spare storage device, and writes the parity of each stripe in the certain member storage device.

In an embodiment 7 according to the embodiment 6, the controller returns the RAID level of the RAID group from the second RAID level to the first RAID level by removing the certain member storage device from the RAID group (for example, updating the contents of a prescribed table to reflect that the certain member storage device has been removed from the RAID group), and managing the above-mentioned selected spare storage device as a member of the RAID group (for example, updating a prescribed table to reflect that the spare storage device is comprised in the RAID group).

In an embodiment 8 according to at least one of the embodiments 1 to 7, the second RAID level is a RAID level in which at least one parity is created for each stripe of the RAID group. The above-mentioned selected spare storage device is provided in plurality. The controller distributes a plurality of parities, for the plurality of stripes constituting the RAID group, to the above-mentioned selected plurality of spare storage devices.

In an embodiment 9 according to at least one of the embodiments 1 to 8, the second RAID level is a RAID level in which at least one parity is created for each stripe, which is a storage area constituting the RAID group. The controller distributes a plurality of parities, for the plurality of stripes constituting the RAID group, to the above-mentioned selected spare storage device and the above-mentioned not less than two member storage devices.

In an embodiment 10 according to at least one of the embodiments 1 to 9, a change from the first RAID level to the second RAID level requires the reading out of information elements from the not less than two member storage devices (either one of the data elements or parities, which will be explained hereinbelow) for each stripe, which is a storage area constituting the RAID group. A logical volume is formed based on the storage space of the RAID group, and the logical volume is made up of a plurality of pages, which is a plurality of storage areas. When a write command received from outside the storage system (for example, an application, switching device, or host computer, hereinafter called a "host" for convenience sake) specifies a virtual storage area in a virtual volume, the controller allocates a page selected from the plurality of pages to this virtual storage area, and writes an information element conforming to the above-mentioned write command to the allocated page. In this case, the controller carries out an information element read only for the stripe corresponding to the page allocated to the virtual logical volume when changing from the first RAID level to the second RAID level.

In an embodiment 11 according to at least one of the embodiments 1 to 10 (and the below described embodiments 12 to 20), either one or a plurality of spare storage devices is shared for use with a plurality of RAID groups.

In an embodiment 12 according to at least one of the embodiments 1 to 11, the controller has a cache memory. The controller is constituted so as to receive a write command from the host, write an information element based on this write command to the cache memory, and, in this case, report write-completion to the host and write this information element to the RAID group asynchronously thereto. If the controller is in the midst of changing the RAID level of the RAID group, the controller holds off on writing the information element stored in the cache memory to the RAID group, and writes this information element to the RAID group subsequent to the RAID level change completion.

In an embodiment 13 according to at least one of the embodiments 1 to 12, the second RAID level is a level in which many more parities are created than in the first RAID level for each stripe, which is a storage area making up the RAID group. More specifically, for example, the second RAID level is RAID 6, and the first RAID level is RAID 5.

In an embodiment 14 according to the embodiment 13, when the error rate of a certain member storage device of the not less than two member storage devices exceeds the first threshold, the controller executes, for each stripe constituting the RAID group, read-out of not less than two information elements stored in a stripe, creation of a parity based on the not less than two information elements, and writing of the created parity to the above-mentioned selected spare storage device. The controller changes the RAID level of the RAID group from the first RAID level to the second RAID level by managing the above-mentioned selected spare storage device as another member of the RAID group.

In an embodiment 15 according to the embodiment 14, the controller is constituted so as to carry out the above-described information backup process (for example the dynamic sparing explained hereinbelow), and the first threshold is lower than the above-mentioned second threshold.

In an embodiment 16 according to the embodiment 15, subsequent to the information backup process, the controller returns the RAID level of the RAID group from the second RAID level to the first RAID level by writing the information element stored in the above-mentioned other spare storage device to a post-replacement member storage device, which is the storage device mounted in place of the above-mentioned certain member storage device subsequent to this certain member storage device having been removed from the storage system, and removes the above-mentioned selected spare storage device from the members of the RAID group.

In an embodiment 17 according to the embodiment 14, the controller returns the RAID level of the RAID group from the second RAID level to the first RAID level by writing an information element stored in a certain member storage device to the above-mentioned selected spare storage device for each stripe making up the RAID group, writing the parity for each stripe to the certain member storage device, and removing this certain member storage device from the RAID group.

In an embodiment 18, the controller is constituted so as to receive a write command from the host, write an information element based on this write command to the cache memory, and, in this case, report write-completion to the host and write this information element to the RAID group asynchronously thereto. If the controller is in the midst of changing the RAID level of the RAID group, the controller holds off on writing the information element stored in the cache memory to the RAID group, and writes this information element to the above-mentioned RAID group subsequent to the RAID level change ending. In this embodiment 18, the changing of the RAID level can use a method, which provides a free area in the RAID group, and makes use of this free area to change the RAID level, instead of the method, which makes use of a spare storage device. That is, in the embodiment 18, the existence of a spare storage device is not essential.

In an embodiment 19, the controller changes the RAID level of the RAID group from the first RAID level to the second RAID level, which features higher fault tolerance than the first RAID level, prior to carrying out the information backup process. In this embodiment 19, the changing of the RAID level can use a method, which provides a free area in the RAID group, and makes use of this free area to change the RAID level, instead of the method, which makes use of a spare storage device. More specifically, for example, the controller carries out the above-mentioned RAID level change when the error rate of a certain member storage device of the not less than two member storage devices exceeds the first threshold, which is lower than the above-mentioned second threshold.

In an embodiment 20 according to the embodiment 12 or 18, the controller comprises a higher-level I/F, which is an interface device for the host, and a lower-level I/F, which is an interface device for the plurality of storage devices. The higher-level I/F is constituted so as to carry out the receiving of a write command from the host, the writing of an information element based on this write command to cache memory, and the reporting of write-completion to the host. The lower-level I/F is constituted so as to carry out the writing of the information element stored in the cache memory to the RAID group, the changing of the RAID level of the RAID group, the holding off of writing the information element stored in the cache memory to the RAID group if the RAID level is in the process of being changed, and the writing of this information element to the RAID group subsequent to the RAID level change completion.

Two or more of the embodiments among above-mentioned plurality of embodiments 1 to 20, can be combined. Further, the above-described storage system can be constituted from either one or a plurality of storage subsystems. The above-described controller, for example, can be a circuit comprising a processor and a memory. Various processing, such as the above-described changing of the RAID level, can be carried out by the processor reading a computer program from memory and executing this computer program. The computer program can be installed in the computer from a CD-ROM or other such recording medium, or the computer program can be downloaded to the computer via a communications network.

A number of the embodiments of the present invention will be explained in detail below by referring to the figures.

First Embodiment

FIG. 1 shows the constitution of a computer system related to a first embodiment of the present invention.

Either one or a plurality of host computers 100, and a storage system 300 are connected to a first communications network, for example, a SAN 200.

The host computer 100, for example, is a computer apparatus comprising information processing resources, such as a CPU (Central Processing Unit), and a memory, and, for example, is constituted as a personal computer, workstation, mainframe or the like.

The storage system 300, for example, can be a RAID system comprising a large number of disk drives 321 arranged in an array. The storage system 300 can be broadly divided into a storage controller 310 and a storage unit 320.

The storage controller 310, for example, comprises a plurality of (or one) channel adapters (hereinafter, CHA) 311, a plurality of (or one) disk adapters (hereinafter, DKA) 315, a cache memory (abbreviated as "CM" in the figure) 316, a shared memory (abbreviated as "SM" in the figure) 312, a connector 313, and a service processor (hereinafter, abbreviated as "SVP") 317.

The CHA 311 is an interface device for carrying out data communications with the host computer 100 or another storage system. The CHA 311, for example, can be constituted as a microcomputer system (for example, a circuit board) comprising a microprocessor (hereinafter, MP) 3112, a memory 3113, and a port 3111.

Figure 2:
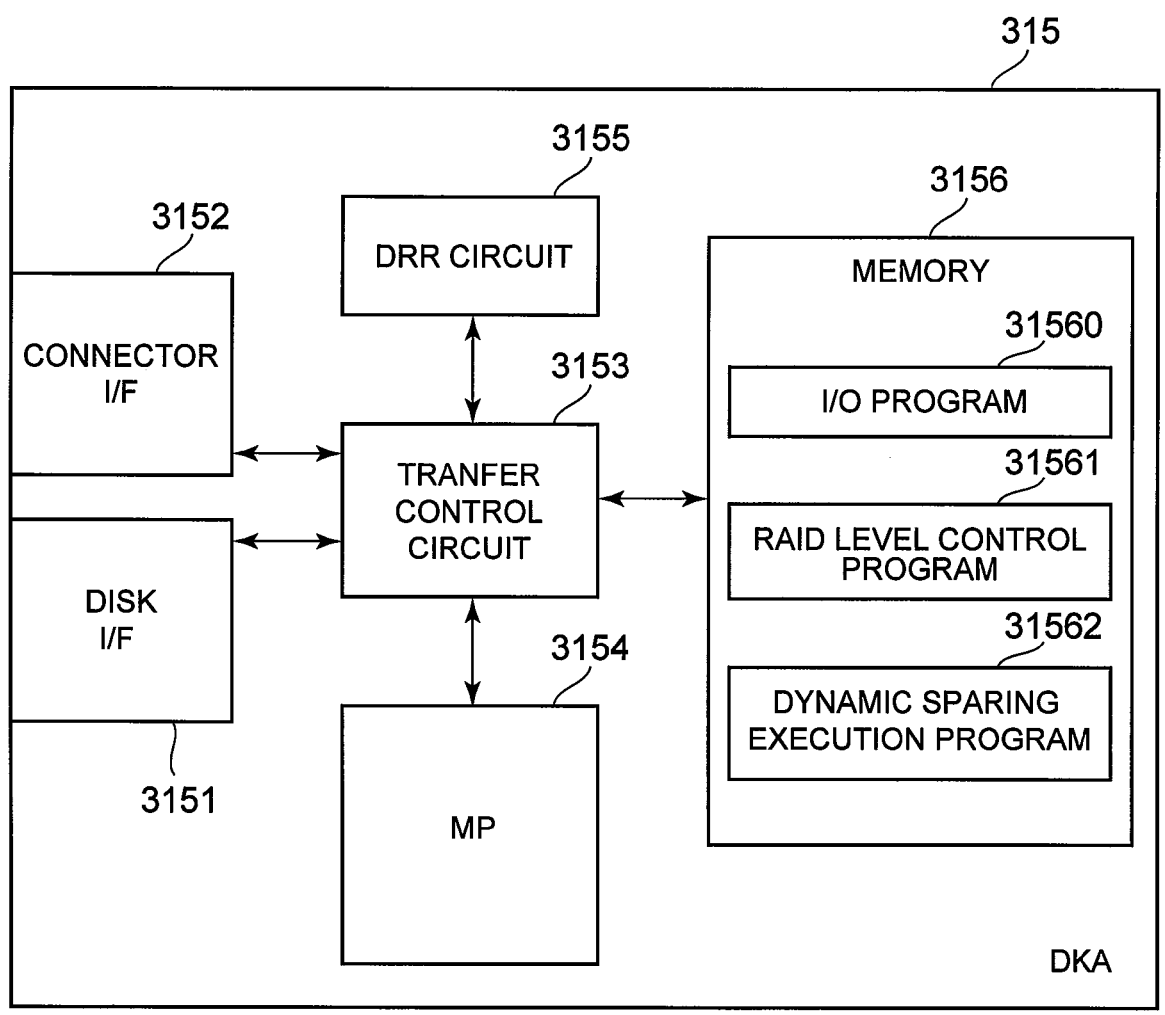
FIG. 2 shows an example of the constitution of a DKA (disk adapter)

The DKA 315 is an interface device for carrying out data communications with a disk drive 321. The DKA 315, as illustrated in FIG. 2 for example, can be constituted as a microcomputer system (for example, a circuit board) comprising a connection I/F 3152 (an interface device for carrying out communications via the connector 313), a disk I/F 3151 (an interface device for carrying out communications with a disk drive 321), a microprocessor (hereinafter, MP) 3154, a memory 3156, a DRR (Data Recovery and Reconstruct) circuit 3155, and a transfer control circuit 3153 (a circuit for controlling the transfer of data among the elements 3151, 3152, 3154, 3155, and 3156 provided on top of the DKA 315). The DRR circuit (hereinafter, called simply "DRR") 3155 is a hardware circuit, which inputs a specified plurality of information elements, creates parity based on this plurality of information elements, and outputs this created parity. Furthermore, an "information element" used in the explanation of this embodiment specifies either one of a data element or a parity, which will be described hereinbelow. The plurality of information elements inputted to the DRR circuit comprises at least one data element. The memory 3156, for example, stores an I/O program 31560, which carries out inputting and outputting to and from a disk drive 321 as part of the processing of an I/O command (input/output command) from the host computer 100, a RAID level control program 31561, which carries out the processing for changing the RAID level, and a dynamic sparing execution program 31562, which executes dynamic sparing, which will be explained hereinbelow. The MP 3154 executes these respective computer programs 31560, 31561 and 31562, thereby executing the input/output of data to/from a disk drive 321, the change of the RAID level, and dynamic sparing. Hereinafter, whenever a computer program is the subject of a sentence, it is supposed that processing is actually carried out by the processor, which executes this computer program.

The cache memory 316, for example, is either a volatile or nonvolatile memory, and temporarily stores data received from the host computer 100 and data read out from the disk drive 321.

The shared memory 312, for example, is either a volatile or nonvolatile memory, and stores information referenced by the CHA 311 and DKA 315. Information stored in the shared memory 312, for example, includes error rate threshold A (hereinafter, simply called "threshold A"), which will be explained hereinbelow, error rate threshold B (hereinafter, simply called "threshold B"), and a group of management tables. The management table group, for example, comprises a RAID level management table 3121 (Refer to FIG. 3A), an LDEV management table 3122 (Refer to FIG. 3B), and a disk management table 3124 (refer to FIG. 3C). The respective tables 3121, 3122, and 3124 will be described in detail below.

The connector 313 interconnects the CHA 311, DKA 315, cache memory 316, shared memory 312 and SVP 317. For example, a bus, or ultra-high-speed crossbar switch, which carries out data transmission via high-speed switching operations, can be employed as the connector 313.

The SVP 317 is a device (for example, a circuit board) for maintaining and/or managing the storage system 300. The SVP 317 is connected to a second communications network, for example, a LAN 500, and can communicate via the LAN 500 with a maintenance terminal (for example, a personal computer or other such computer) 600. The SVP 317 can be utilized as a control console, and the maintenance terminal 600 can serve as the input/output console for the SVP 317.

The storage unit 320 comprises a plurality of disk drives (hereinafter, simply called "disks") 321. A RAID group 323 of a prescribed RAID level can be constituted by no less than two disks 321. Either one or a plurality of logical storage devices (hereinafter, described as "LDEV") 322 can be formed by using the storage space of the no less than two disks 321 constituting the RAID group 323. The LDEV can also be called a logical unit (LU) or a logical volume. Drives for disk-type storage media, such as hard disks, flexible disks, and optical disks, for example, can be used as the disks 321. Further, other types of physical storage devices, such as magnetic tape drives, or semiconductor memory (for example, flash memory) drives, can be used instead of the disks 321.

The preceding is the constitution of the computer system related to this embodiment. Furthermore, this constitution is only an example, and other constitutions can also be employed. For example, shared memory 312 and cache memory 316 do not have to be separate memories, but rather a shared memory area and a cache memory area can be provided in a single memory. Further, for example, the storage controller 310 can be a circuit board comprising a CPU, a memory and a plurality of communication ports (that is, a simpler constitution than that of the storage controller of FIG. 1). In this case, this CPU can execute the processing carried out by the plurality of CHA 311 and DKA 315.

The various types of tables in the management table group stored in the shared memory 312 will be explained below.

FIG. 3A shows an example of the constitution of a RAID level management table 3121.

The RAID level management table 3121 records for each LDEV 322 a LDEV number (for example, "LDEV #0") for identifying an LDEV 322, a RAID level (for example, "RAID 5"), a disk configuration, and a RAID level status. When specifying a certain LDEV hereinbelow, it is supposed that the LDEV number will be used to specify an LDEV, and in particular that quotation marks such as " " will be used to signify the LDEV number itself. More specifically, for example, when specifying an LDEV 322 with an LDEV number of "LDEV #0", simply LDEV #0 will be used.

The "disk configuration" denotes the types of information elements residing in one stripe (the meaning of a stripe will be explained hereinbelow) in the RAID group 323. More specifically, for example, the disk configuration value "3D+1P" signifies that three data elements to be referred to the host computer 100, and one parity created based on these three data elements, are written in a single stripe.

Values denoting the RAID level status include "established", which signifies that the RAID level has been established, and a value signifying that the RAID level is in the process of being changed. As for the value signifying that the RAID level is in the process of being changed, "X-Y" is recorded as the value denoting the RAID level status when the RAID level is in the process of being changed form X to Y (X and Y are values denoting arbitrary RAID levels, for example, RAID 5 and RAID 6.).

FIG. 3B shows an example of the constitution of a LDEV management table 3122.

The LDEV management table 3122 records for each LDEV 322 a RAID group number (for example, "RG #0"), a LDEV number (for example, "LDEV #0"), and disk numbers (for example, "disk #1", "disk #2", "disk #3" and "disk #4") respectively denoting the plurality of disks 321 related to the LDEV 322. The RAID group number denotes the RAID group based on an LDEV.

FIG. 3C shows an example of the constitution of a disk management table 3124.

The disk management table 3124 records for each disk 321 a disk ID (for example, "disk A"), a disk number (for example, "disk #1"), a disk status, and an error rate. Values denoting the disk status, for example, include "Normal", which signifies that the disk 321 is normal, and "Threshold A_Over" and "Threshold B_Over", which signify that the error rate of the disk 321 has exceeded either threshold A or threshold B.

The disk ID is an ID unique to a disk 321, and is constant, whereas a disk number can be replaced. Since the disks 321 based on respective LDEV formed on the basis of a RAID group are denoted by disk numbers, a disk 321, which is a member of the RAID group, can be uniquely specified from the combination of the disk ID and disk number. When specifying a certain disk 321 hereinbelow, it is supposed that a disk number will be used to specify a disk, and in particular that quotation marks such as " " will be used to signify the disk number itself. More specifically, for example, when specifying a disk 321 with a disk number of "disk #3", simply disk #3 will be used. Furthermore, since the disk number allocated to a disk 321 can be replaced, for example, when a disk number of "spare 1" is allocated in place of "disk #3" to a disk (hereinafter, target disk C) to which "disk #3" has been allocated, target disk C becomes spare 1, and is managed as a spare.

An overview of the processing carried out by this embodiment will be explained hereinbelow.

The storage system 300 comprises a plurality of (or one) spare disks 321 for a plurality of (or one) RAID groups 323. A spare disk 321, for example, is not provided as a dedicated spare for a single RAID group 323, but rather is provided as a spare to be shared by the plurality of RAID groups 323. A RAID level control program 31561 executed by the MP 3154 of the DKA 315 utilizes a spare disk, and executes processing related to changing the RAID level (hereinafter, RAID level change process). An I/O command can be received from the host computer 100 even in the middle of a RAID level change process. That is, a RAID level change process can be carried out while online.

The RAID level change process includes a process for changing the RAID level to a RAID level with superior fault tolerance (for convenience sake, called "RAID-UP process" hereinafter), and a process for changing the RAID level to a RAID level with inferior fault tolerance (for convenience sake, called "RAID-DOWN process" hereinafter). The disk 321 error rate is used as a trigger for carrying out a RAID-UP process. Either the number or frequency of errors can be used as the error rate.

More specifically, shared memory 312 stores threshold B, which is used to determine whether or not to execute dynamic sparing, and threshold A, which is used to determine whether or not to execute a RAID-UP process. Threshold A is a lower value than threshold B.

The I/O program 31560 executed by the MP 3154 of the DKA 315 monitors the error rates of the disks 321. Disk 321 errors can include various types of errors, such as, for example, when a reply is not returned from a disk 321 within a specified time period after an I/O command has been sent to the disk 321, and when a mismatch is detected as the result of a verify process (a process in which data written to a disk 321 is read from the disk 321, and this read data is compared against the written data). In this embodiment, it is supposed that the detection of a mismatch as the result of a verify process was detected as the disk 321 error. Further, in this embodiment, since an I/O command can be received from the host computer 100 and processed even during a verify process, this verify process will be called an "online verify".

Figure 31:
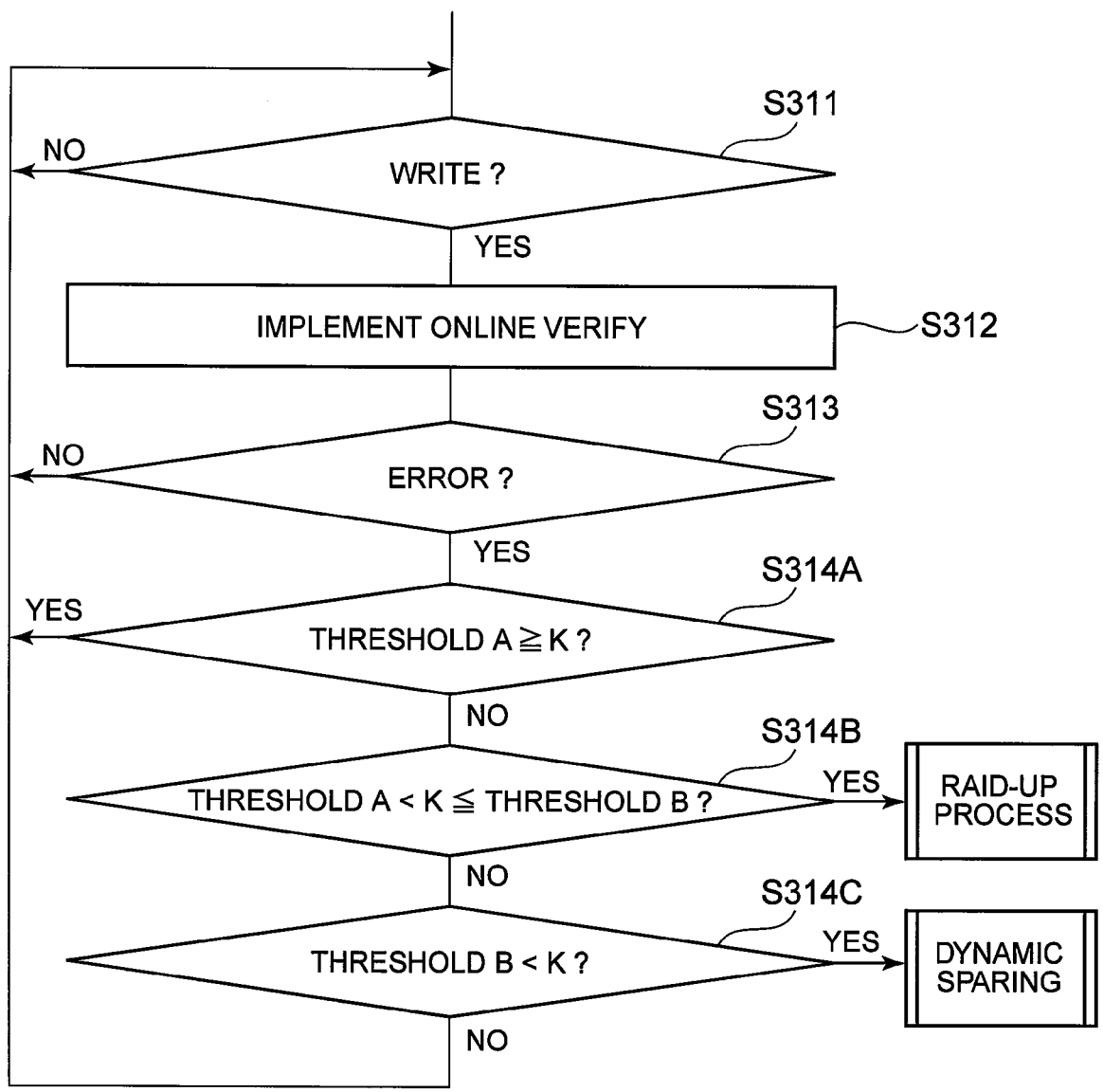
FIG. 31 shows one example of the flow of error rate monitoring in the first embodiment.

For example, whenever the I/O program 31560 writes an information element to a disk 321 (S311: YES), as described in FIG. 31, the I/O program 31560 reads the written information element from this disk 321, and compares the read information element against the information element, which had been written to this disk 321 (for example, the information element remaining either in the memory 3156 of the DKA 315, or in the cache memory 316) (S312). When a mismatch is detected as a result (S313: YES), the I/O program 31560 updates the error rate (the error rate recorded in the disk management table 3124) corresponding to the write request-destination disk 321 (for example, disk #3), and compares the update error rate (denoted by the letter "K" in FIG. 31) against threshold A and threshold B.

If the post-update error rate K of a certain disk (for convenience sake, "disk #3" hereinafter) is not more than threshold A (S314A: YES), the I/O program 31560 returns to S311, and if this post-update error rate K is greater than threshold A but not more than threshold B (S314A: No; S314B: YES), the I/O program 31560 changes the disk status corresponding to disk #3 to "Threshold A_Over" (refer to FIG. 24A), invokes the RAID level control program 31561, and executes a RAID-UP process.

If another error occurs in disk #3 thereafter, and the post-update error rate K becomes greater than threshold B (S314A: NO; S314B: NO; S314C: YES), the I/O program 31560 changes the disk status corresponding to disk #3 to "Threshold B_Over" (refer to FIG. 24B), invokes the dynamic sparing execution program 31562, and executes dynamic sparing.

Furthermore, a copy-back is carried out subsequent to dynamic sparing. A RAID-DOWN process is carried out incidental to the copy-back.

A RAID-UP process, dynamic sparing, copy-back, and RAID-DOWN process will be explained hereinbelow. In a RAID-UP process and RAID-DOWN process, a RAID level can be changed from any RAID level to any other RAID level, but in the following explanation, an example is given in which, in a RAID-UP process, the RAID level is changed from RAID 5 (3D+1P) to RAID 6 (3D+1P+1Q), and in a RAID-DOWN process, the RAID level is returned from RAID 6 (3D+1P+1Q) to RAID 5 (3D+1P) (where P signifies the first parity, and Q signifies the second parity, respectively). Furthermore, the reason for using this example is as follows.

The storage capacity of a single disk has increased in recent years, and the time required to copy all of the data elements on a disk has become longer as a result of this. In a copy that takes a long time like this, when a failure occurs in one disk in a RAID 5, and a copy is implemented to recover the data, there is a heightened likelihood of a dual disk failure in which one more disk also fails. When a dual disk failure occurs in RAID 5, data recovery becomes impossible. As a method of avoiding this, the storage system can be preconfigured for RAID 6, which enables data recovery even with a dual disk failure, but when using RAID 6, since two parities must be created for each stripe, which will be described hereinbelow, write performance drops compared to that of RAID 5. Further, RAID 6 initially requires more disks than RAID 5.

Taking this kind of problem into account, in the following example, as a rule, the configuration is RAID 5 (3D+1P), and when the error rate of a certain disk 321 exceeds threshold A in a RAID 5 RAID group, a RAID-UP process, which changes the RAID level from RAID 5 (3D+1P) to RAID 6 (3D+1P+1Q), is carried out as described above.

<<RAID-UP Process>>

Figure 4A:
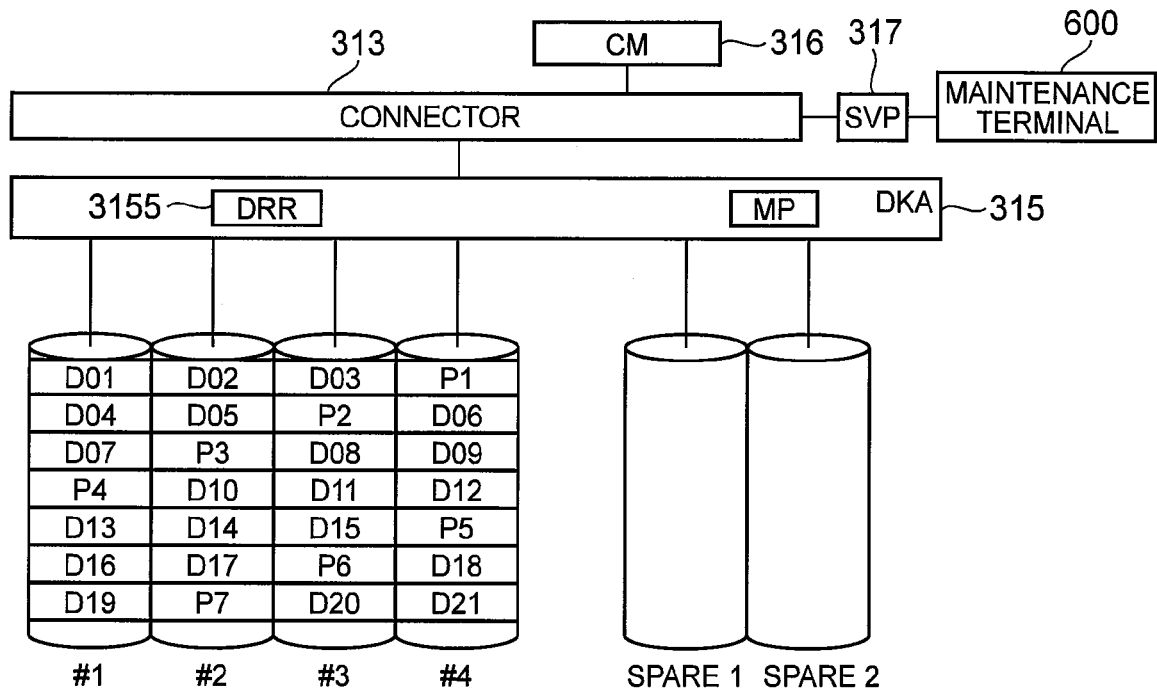
FIG. 4A shows one example of a RAID group prior to RAID-UP processing in the first embodiment.
Figure 4B:
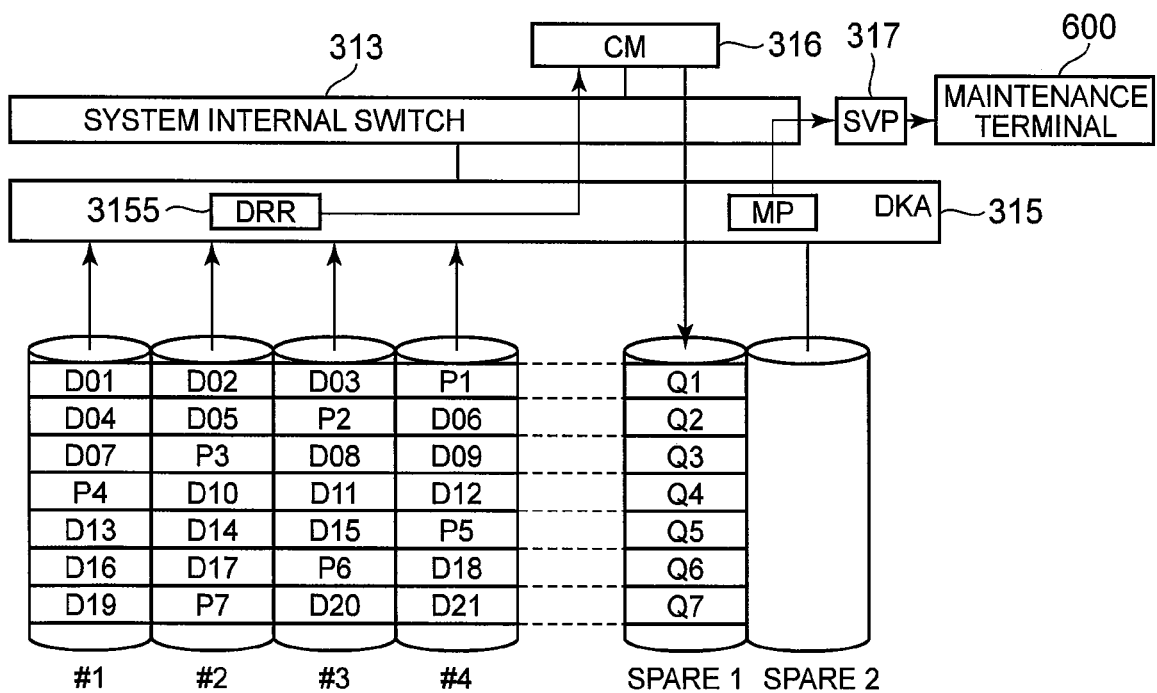
FIG. 4B shows an overview of RAID-UP processing, and one example of a RAID group subsequent to this RAID-UP processing in the first embodiment.
Figure 5:
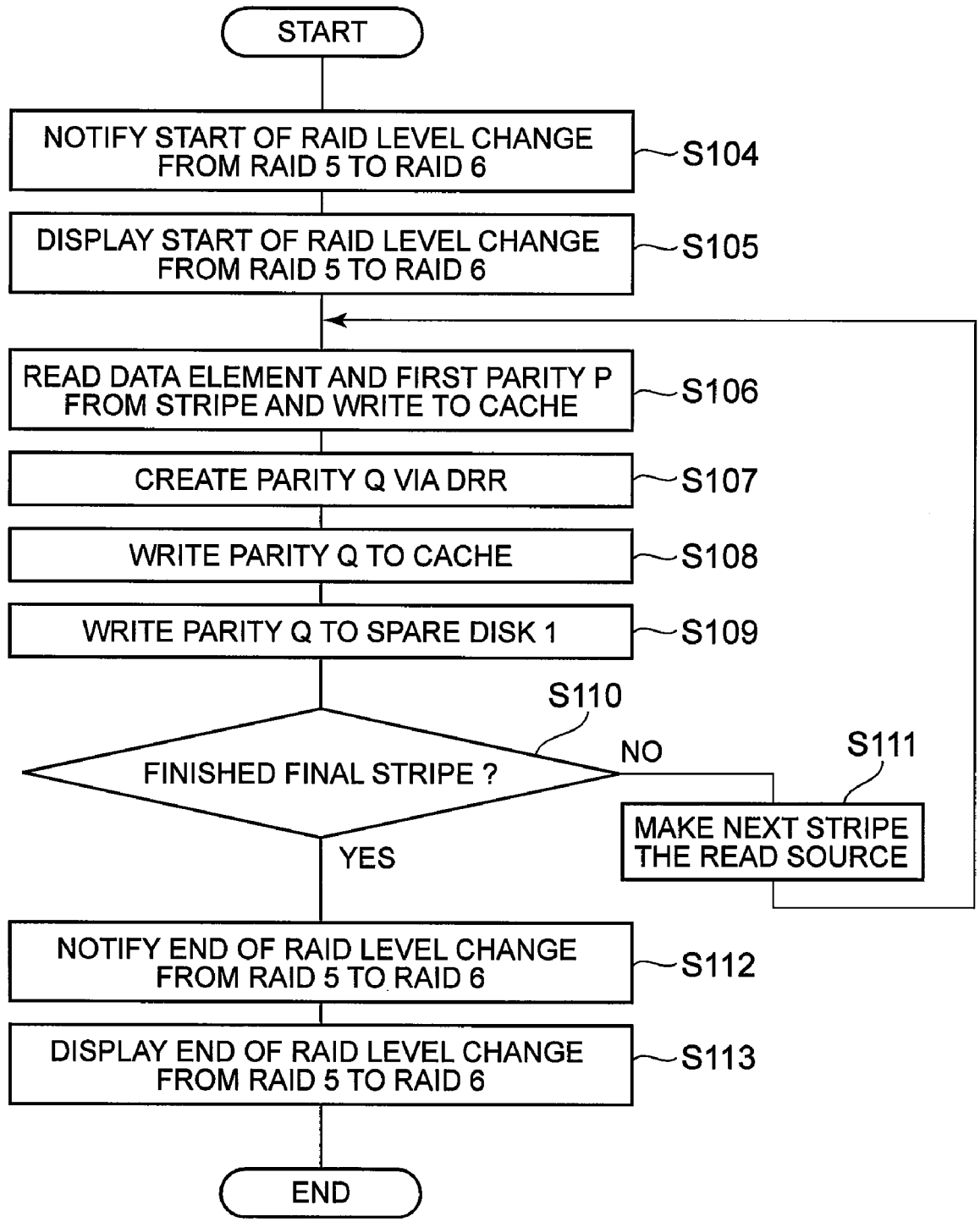
FIG. 5 is a flowchart of a RAID-UP process in the first embodiment.

FIG. 4A shows an example of a RAID group prior to a RAID-UP process. FIG. 4B shows an overview of a RAID-UP process and an example of a RAID group subsequent to a RAID-UP process. FIG. 5 is a flowchart of a RAID-UP process. A RAID-UP process will be explained below by referring to FIG. 4A, FIG. 4B and FIG. 5.

For example, as shown in FIG. 4A, RAID 5 (3D+1P) is made up of four disks 321, disk #1, disk #2, disk #3 and disk #4. Then spare 1 and spare 2 are provided as two spare disks 321. The RAID group is divided into a plurality of storage areas by striping, the respective storage areas span disk #1 through disk #4, which constitute the RAID group. These storage areas are the "stripes" referred to in this embodiment. A storage area constituting a stripe component of a single disk 321 will be called a "stripe area" hereinafter. Further, in this embodiment, the unit stored in a stripe area is the "information element" referred to in this embodiment, more specifically, either a "data element" or a "parity".

Triggered by the error rate of at least one of disk #1 through disk #4 having exceeded threshold A, the RAID level control program 31561 reads out all of the data elements (three data elements and a first parity (hereinafter, parity P)) for each stripe from disk #1 through disk #4, creates a second parity (hereinafter, parity Q) in the DRR circuit 3155, and writes the created parity Q to spare 1 (as a result of this, the parity Q for all the stripes is collected in spare 1). Consequently, the RAID level is changed from RAID 5 to RAID 6 while online.

More specifically, for example, when the error rate of disk #3 is greater than threshold A but not more than threshold B, the RAID level control program 31561 references the LDEV management table 3122, specifies the LDEV based on disk #3, and updates the RAID level status (the RAID level status recorded in the RAID level management table 3121) corresponding to the specified LDEV (for example, LDEV #0, LDEV #1 and LDEV #2) to "RAID 5-6" denoting that the RAID level is in the process of being changed from RAID 5 to RAID 6 (Refer to FIG. 21A).

Further, the RAID level control program 31561 selects one spare disk 321 (for example, spare 1) from among the plurality of spare disks 321. The RAID level control program 31561 carries out exclusive control for spare 1 at this time (for example, locks spare 1) so that spare 1 is not used in a RAID level change in another RAID group.

The RAID level control program 31561 notifies the SVP 317 of information comprising the status in which the RAID level configuration changed from RAID 5 to RAID 6 (hereinafter, configuration change status) (S104). This information, for example, comprises information denoting the current configuration of the RAID group, which was the target of the RAID level change (for example, the fact that the component disks are disk #1 through disk #4), information denoting the LDEV provided based on this RAID group (for example, LDEV #0 through LDEV #2), and information denoting the spare disk 321, which is being used as the storage destination for the parity Q (for example, information denoting spare 1). The SVP 317 sends to the maintenance terminal 600 information, which was achieved by analyzing the received status information, and which denotes which RAID group is being migrated from RAID 5 to RAID 6, and the maintenance terminal 600 displays this information (S105). An example of the screen displayed by the maintenance terminal 600 in this S105 is shown in FIG. 29A. Furthermore, the screen displayed by the maintenance terminal 600 will be called the "maintenance screen" hereinafter for convenience sake.

The RAID level control program 31561 reads all of the information elements in a stripe (for example, data element D01, data element D02 and data element D03, and parity P1), and writes these information elements to cache memory 316 (S106). The RAID level control program 31561 creates a parity Q (for example, parity Q1) in the DRR circuit 3155 based on these information elements (S107). The created parity Q is written to cache memory 316 (S108). The RAID level control program 31561 writes this parity Q to spare 1 (S109). The area to which this parity Q is written in spare 1 is treated as the stripe component in which the information elements, which are constituted on the basis of the creation of the parity Q, are stored subsequent to finishing the change from RAID 5 to RAID 6.

If it is a stripe for which step S106 through step S109 have not been carried out (S110: NO), the RAID level control program 31561 makes the next stripe the read source for S106 (S111), and carries out S106 for this stripe.

If step S106 through step S109 have been carried out for all the stripes (S110: YES), the RAID level control program 31561 adds "spare 1" as the disk 321, which makes up the LDEV (the disk 321 constituting the RAID group) for all the LDEV based on disk #3 (for example, LDEV #0 through LDEV #2) (refer to FIG. 23A), changes the RAID level from "RAID 5" to "RAID 6", changes the disk configuration from "3D+1P" to "3D+1P+1Q", and changes the RAID level status from "RAID 5-6" to "Established" (refer to FIG. 21B). Consequently, the RAID group components change from disk #1 through disk #4 to disk #1 through disk #4 and spare 1, and the RAID level changes from RAID 5 (3D+1P) to RAID 6 (3D+1P+1Q). The RAID level control program 31561 notifies the SVP 317 of information comprising the configuration change end status, which signifies that the change from RAID 5 to RAID 6 is complete (S112). The SVP 317 specifies the fact that the RAID level has temporarily become RAID 6 by analyzing the information comprising the configuration change end status, and sends information denoting this fact to the maintenance terminal 600, and the maintenance terminal 600 displays this information (S113). FIG. 29C shows an example of the maintenance screen displayed in S113.

During the above-described RAID-UP process, the maintenance terminal 600 can display information denoting progress (for example, information denoting what percentage of the processing has been completed). This information, for example, is updated whenever S111 is carried out (FIG. 29B shows one example of the maintenance screen at this time.). More specifically, for example, the RAID level control program 31561 notifies the SVP 317 of the number of stripes that have been read each time the RAID level control program 31561 updates a read-source stripe. The SVP 317 calculates the percentage of the number notified for the total number of stripes in a RAID group, and sends this percentage to the maintenance terminal 600, and the maintenance terminal 600 can display this percentage as the progress status. Furthermore, a progress status (percentage) computation method like this is not limited to the RAID-UP process, but rather can also be applied to dynamic sparing, copy-back, and RAID-DOWN processes, which will be explained hereinbelow.

The above-described RAID-UP process is carried out while online, that is, in parallel to receiving an I/O command from the host computer 100. When the CHA 311 receives an I/O command from the host computer 100 in the midst of RAID-UP processing, this I/O command is processed as follows.

(1) When the I/O Command is a Read Command

If the data conforming to the read command (hereinafter, read data) is in the cache memory 316, the CHA 311 sends this read data to the host computer 100. If this read data is not in the cache memory 316, the CHA 311 reads the read data from the disk 321 by way of the DKA 315, and returns this read data to the host computer 100.

As explained above, when an I/O command is a read command, parity is not created regardless of whether the read data is stored in cache memory 316 or not. Thus, the CHA 311 requests the DKA 315 to read out the read data regardless of whether or not the RAID level is in the process of being changed by the DKA 315.

(2) When the I/O Command is a Write Command

In this case, data conforming to the write command (hereinafter, write data) is written to the disk 321, and parity updating (using the DRR circuit 3155) becomes necessary at this time. Thus, the following processing is carried out.

The CHA 311 receives the write command, writes the data conforming to this write command (hereinafter, write data) to the cache memory 316, and sends a write-end notification to the host computer 100 at this time. The writing of this write data to a disk 321 by the DKA 315 is carried out asynchronously with the receiving of the write command by the CHA 311.

More specifically, when dirty data elements (write data elements not written to disk 321, hereinafter called "new data elements" for convenience sake) is stored in the cache memory 316, the I/O program 31560 executed by the DKA 315 references the RAID level status corresponding to the LDEV 322 constituting the write destination of these data elements (the RAID level status recorded in the RAID level management table 3121), and determines whether or not the RAID level is in the process of being changed. The I/O program 31560, upon determining that the RAID level is in the process of being changed (for example, when the RAID level status is "RAID 5-6"), waits for the RAID level change to end, giving priority to the RAID level change. When it is determined that the RAID level is not in the process of being changed (for example, when the RAID level status has changed to "Established"), the I/O program 31560 reads the new data elements in the cache memory 316 to the plurality of disks 321, which make up the write destination LDEV 322. Whether the RAID level is RAID 5 or RAID 6 at this time, the I/O program 31560 reads the pre-update data elements (called "old data elements" hereinafter), and the old parity corresponding to these old data elements from the respective disks 321 to cache memory 316, and obtains a new parity by inputting the old data elements and old parity together with the new data elements into the DRR circuit 3155. Then, the I/O program 31560 writes the new data elements and new parity to the respective disks 321.

The writing of dirty write data will be explained in detail below for RAID 5 and RAID 6.

(2-1) For RAID 5 (When the Status is not Being Changed from RAID 5 to RAID 6)

Figure 25A:
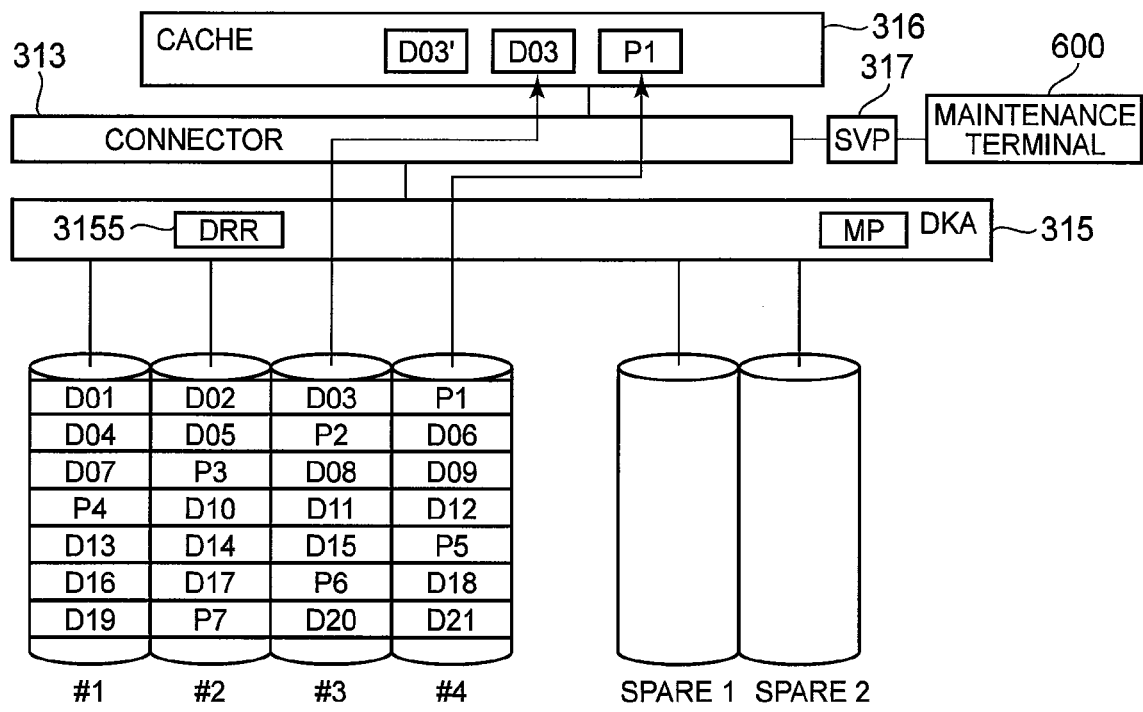
FIG. 25A shows an old data element D03 and an old parity P1 being read out from a disk while online.
Figure 25B:
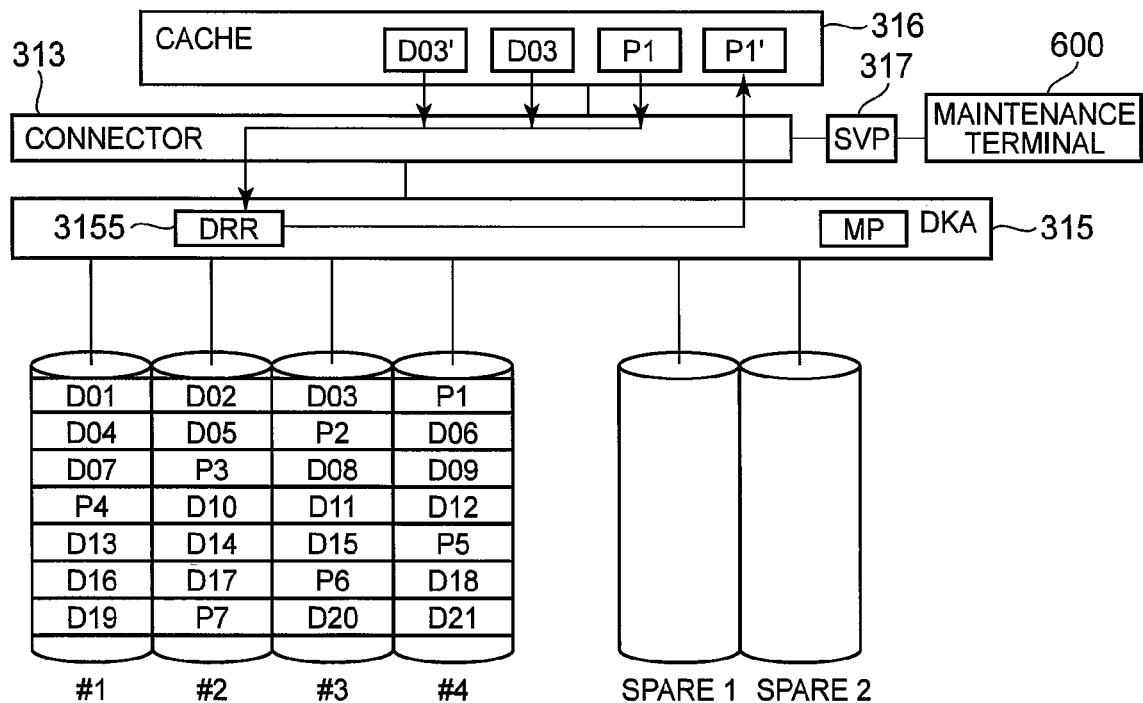
FIG. 25B shows the creation of a new parity P1' using a DRR circuit while online.
Figure 26A:
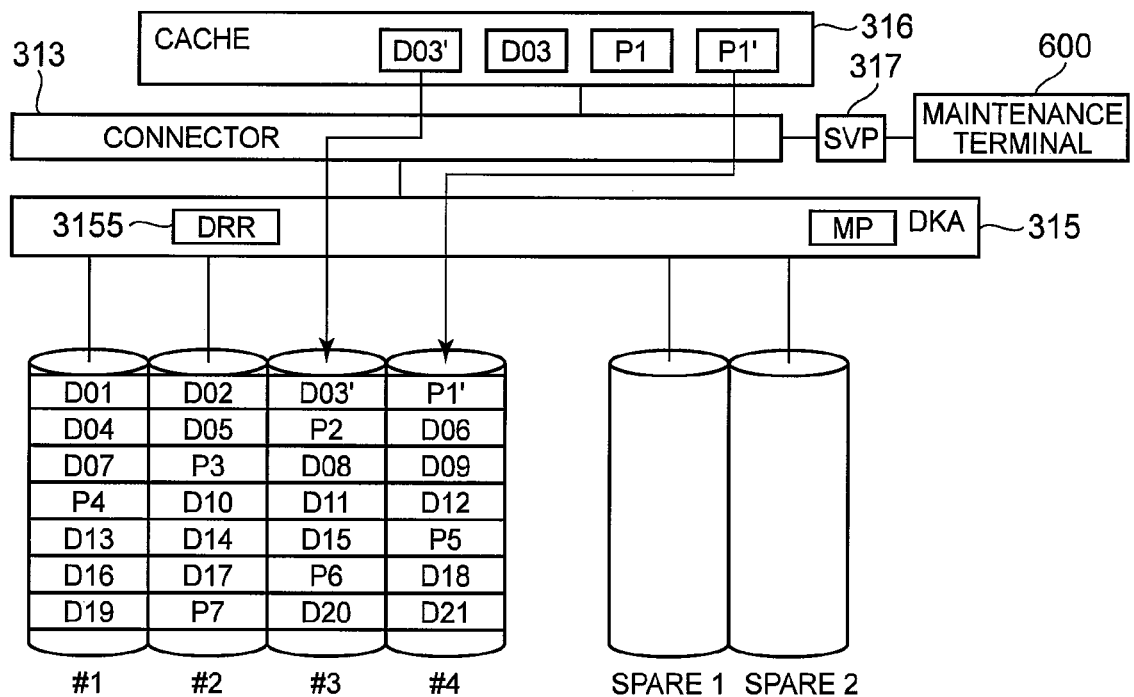
FIG. 26A shows the old data element D03 and old parity P1 being overwritten by a new data element D03' and new parity P1' while online.

The I/O program 31560 reads the old data element D03 corresponding to the new data element D03' and the old parity P1 corresponding thereto from disk #3 and disk #4 to the cache memory 316 as shown in FIG. 25A. The I/O program 31560 acquires a new parity P1' by inputting the read-out data element D03 and parity P1 together with the new data element D03' into the DRR circuit 3155 as shown in FIG. 25B. The I/O program 31560 writes the new data element D03' to the stripe area (stripe area in disk #3) in which the old data element D03 is stored, and writes the new parity P1' to the stripe area (stripe area in disk #4) in which the old parity P1 corresponding thereto is stored, as shown in FIG. 26A.

(2-2) For RAID 6 (When RAID Level is in the Process of Being Changed from RAID 5 to RAID 6)

Figure 26B:
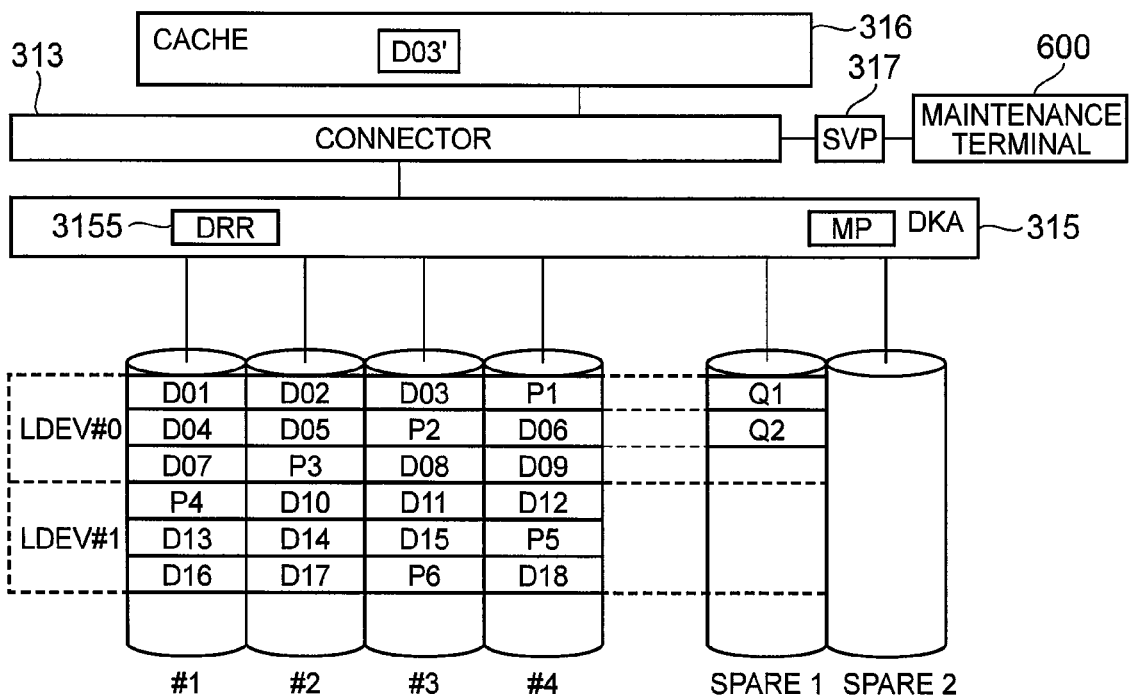
FIG. 26B shows that data element D03' has been written from a host to a cache memory while online, but this data element D03' write has been suspended due to LDEV #0 being in the process of changing from RAID 5 to RAID 6.

It is supposed that the write destination of the new data element D03' is LDEV #0. Then, since the RAID level status corresponding to the LDEV #0 is "RAID 5-6", it is supposed that the status is in the process of changing from RAID 5 to RAID 6 for LDEV #0, as shown in FIG. 26B.

Figure 27A:
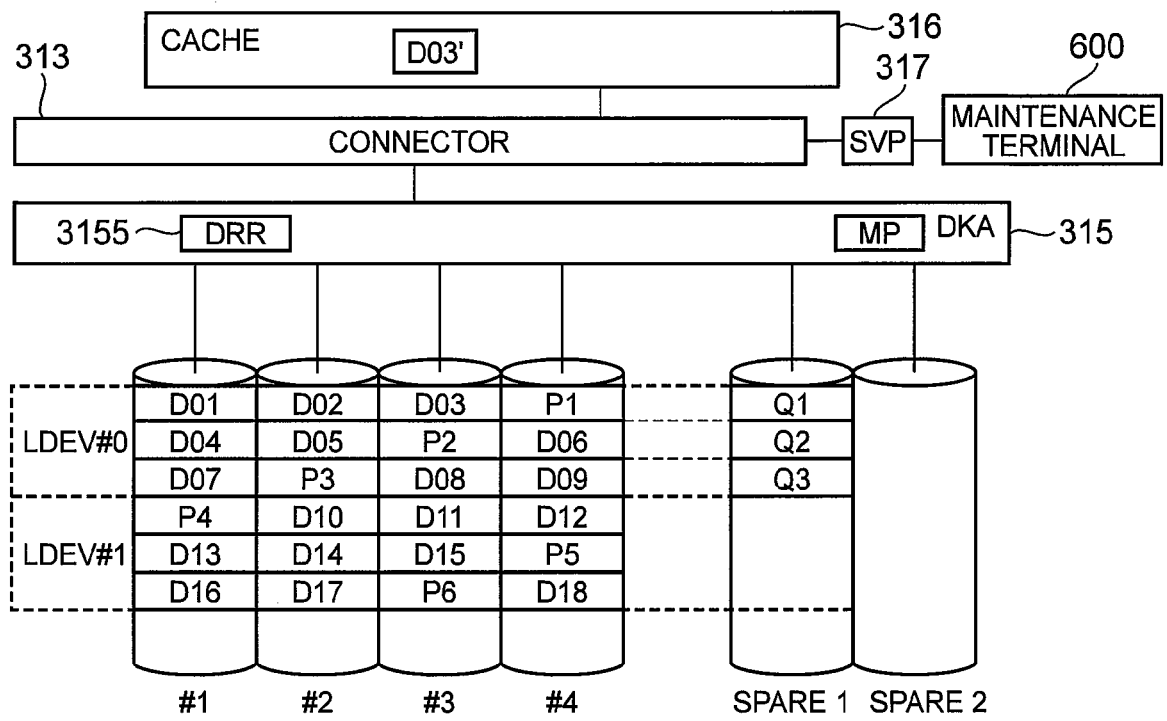
FIG. 27A shows that RAID 6 has been established for LDEV #0.

The I/O program 31560 can specify this by referencing the RAID level management table 3121. Upon specifying this fact, the I/O program 31560, as shown in FIG. 26B and FIG. 27A, waits to write the new data element D03' to the LDEV #0 (more specifically, disk #3 on which LDEV #0 is based) until the change from RAID 5 to RAID 6 has ended at least for LDEV #0.

Figure 27B:
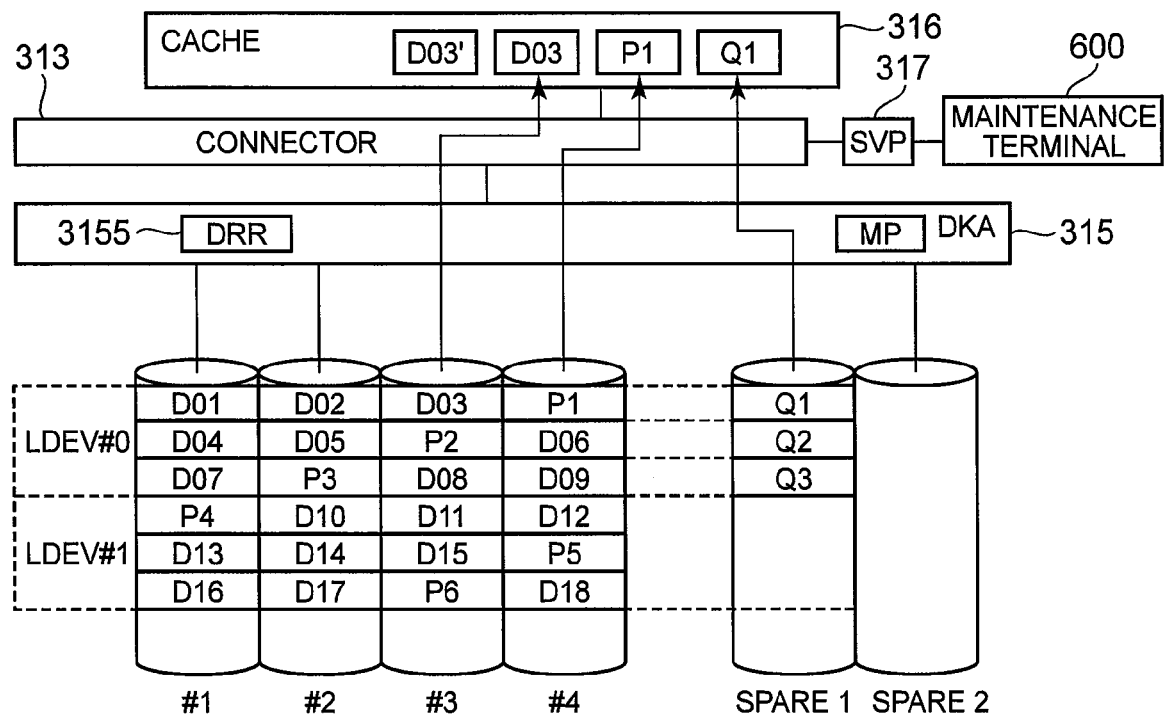
FIG. 27B shows the read-out of the old data element D03 and old parities P1 and Q1 from the disks to cache memory.
Figure 28A:
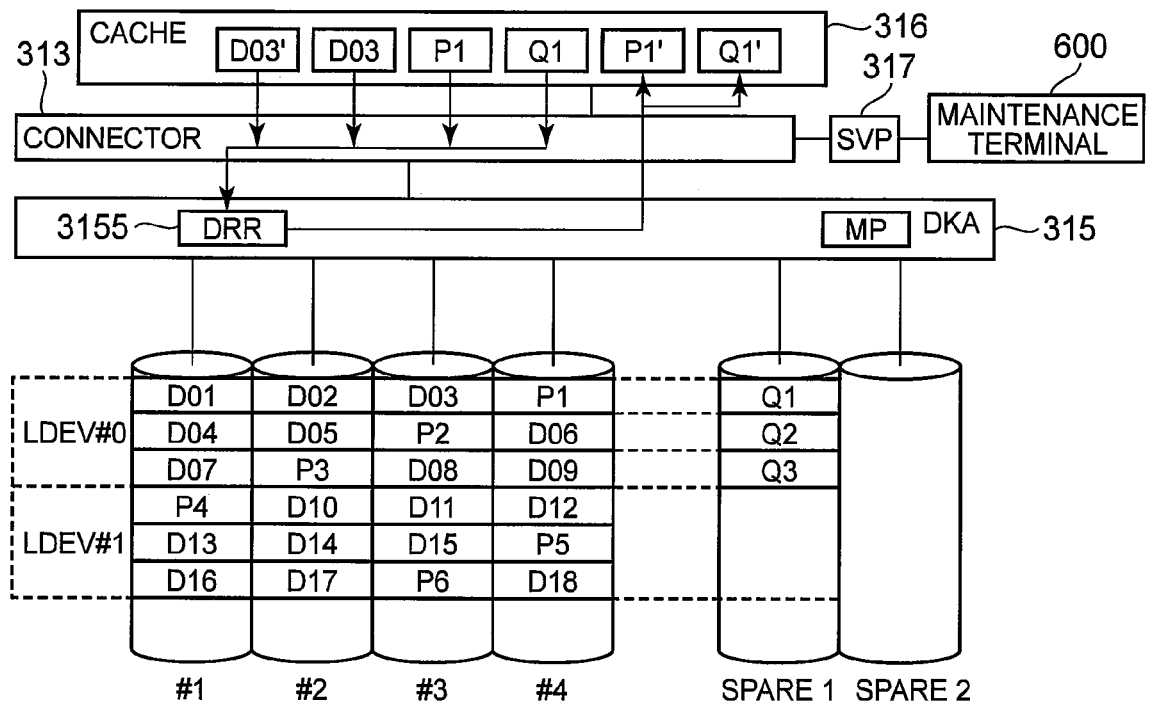
FIG. 28A shows the creation of new parities P1' and Q1'.
Figure 28B:
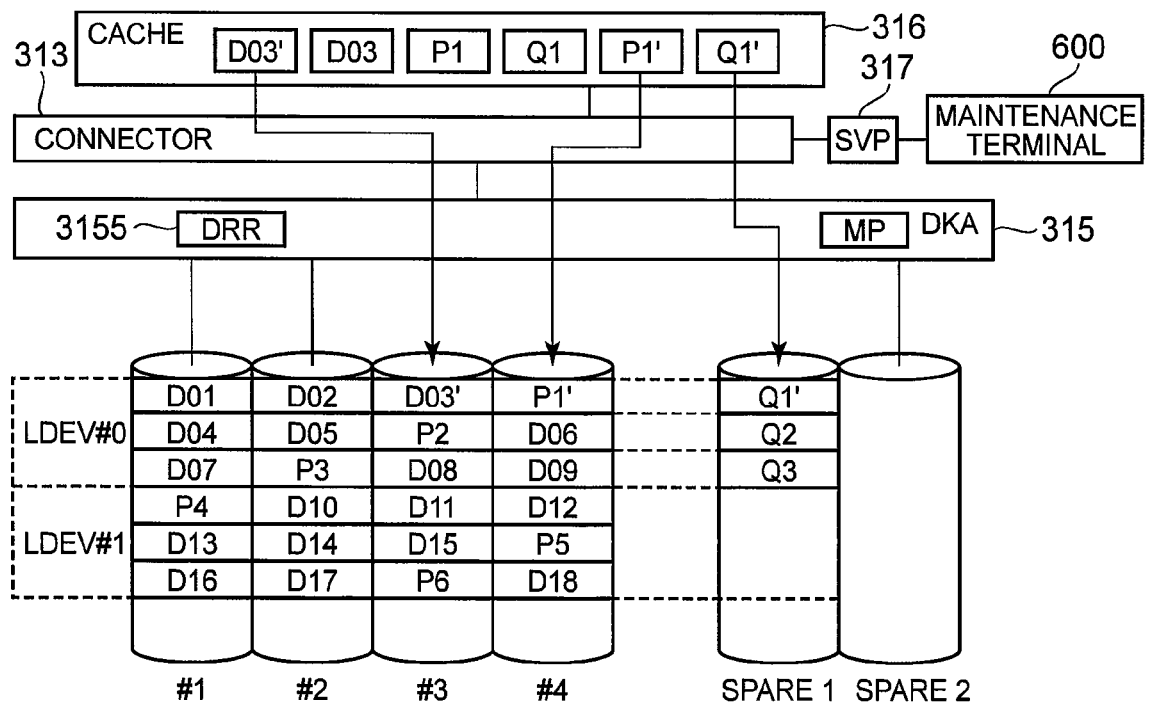
FIG. 28B shows the old data element D03 and old parities P1 and Q1 being written over by the new data element D03' and new parities P1' and Q1' while online.

Upon specifying from the RAID level management table 3121 that the change from RAID 5 to RAID 6 has ended at least for LDEV #0, the I/O program 31560 reads the old data element D03 corresponding to the new data element D03', the old parity P1 corresponding thereto and the old parity Q1 from disk #3, disk #4 and spare 1 to the cache memory 316 as shown in FIG. 27B. The I/O program 31560 obtains new parity P1' and new parity Q1' by inputting new data element D03', old data element D03, old parity P1 and old parity Q1 into the DRR circuit 3155 as shown in FIG. 28A. New parity P1' and new parity Q1' are written to the cache memory 316. As shown in FIG. 28B, the I/O program 31560 writes the new data element D03' to the stripe area in which the old data element D03 is stored (the stripe area of disk #3), writes the new parity P1' to the stripe area in which the old parity P1 corresponding thereto is stored (stripe area of disk #4), and writes the new parity Q1' to the stripe area in which the old parity Q1 corresponding thereto is stored (stripe area of spare 1).

<<Dynamic Sparing>>

Figure 6A:
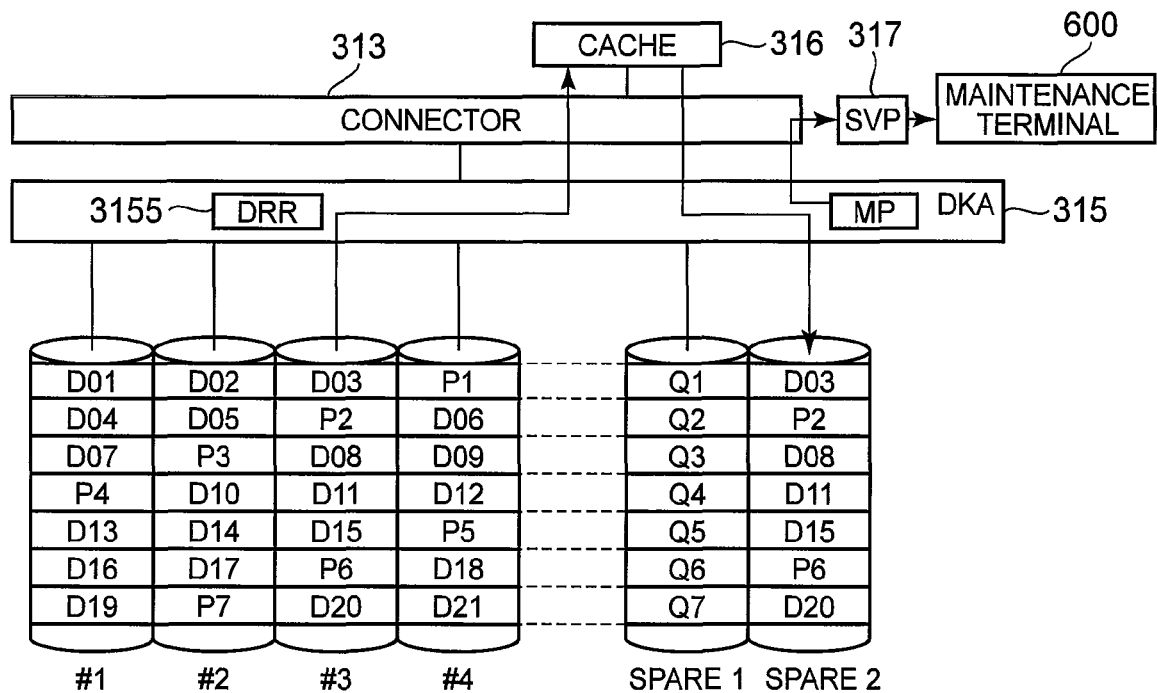
FIG. 6A is a conceptual diagram of dynamic sparing in the first embodiment when a read-out from disk #3 is possible.

FIG. 6A shows an overview of dynamic sparing.

When disk #3 is the disk 321 corresponding to an error rate that exceeds threshold B, writing all the information elements stored in disk #3 to another disk (for example, to a spare disk (spare 2) other than spare 1 in which the parity Q for each stripe is stored) is dynamic sparing (Furthermore, exclusive control can be carried out for spare 2 the same as for spare 1.). Therefore, if all of the information elements can be read out from disk #3, dynamic sparing ends by virtue of a simple copy from disk #3 to spare 2.

Figure 6B:
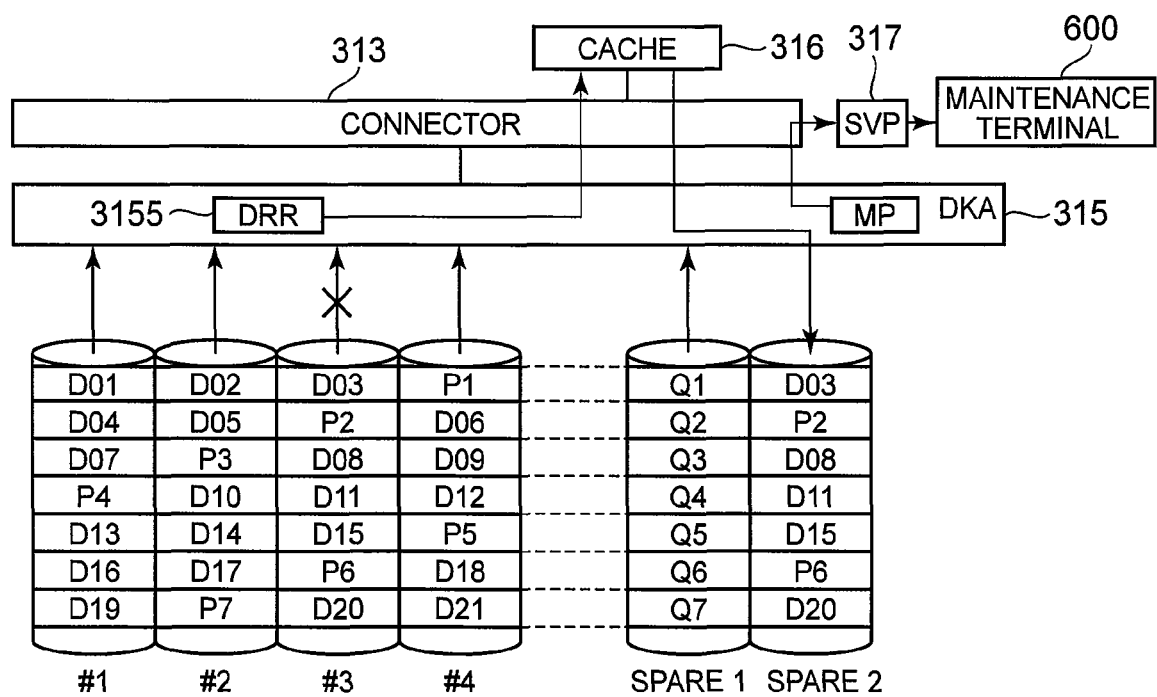
FIG. 6B is a conceptual diagram of dynamic sparing in the first embodiment when a read-out from disk #3 is not possible.

If a failure occurs in disk #3, and a read from disk #3 becomes impossible, as shown in FIG. 6B, the information elements stored in disk #3 can be recovered by reading out the information elements from at least three of the other disk #1, disk #2, disk #4 and spare 1 (no less than three information elements comprising at least one parity), and using the DRR circuit 3155.

Figure 10:
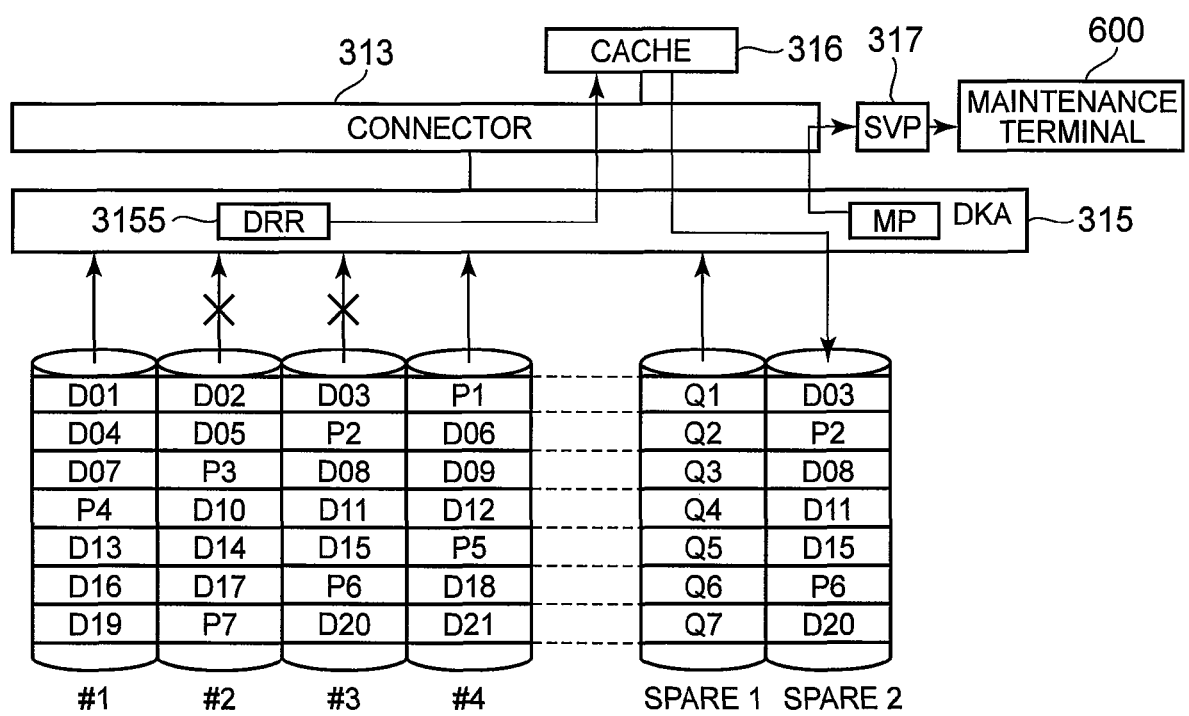
FIG. 10 is a conceptual diagram of dynamic sparing in the first embodiment when read-outs from disk #3 and another disk are not possible.

Or, if a failure occurs not only in disk #3 but in one more disk as well, and it becomes impossible to read data from that disk as well, as shown in FIG. 10, the information elements stored in disk #3 can be recovered by reading the information elements from all the other disks, and using the DRR circuit 3155.

When all the information elements stored in disk #3 have been written to spare 2, the dynamic sparing execution program 31562 updates the LDEV management table 3122 such that the components change from "disk #3" to "spare 2" for each LDEV based on disk #3 (Refer to FIG. 23B). Consequently, the members of the RAID 6 RAID group change from disk #3 to spare 2. Thereafter, for example, when data is written to LDEV #0, which has been formed based on this RAID group, the information elements based on this data (data elements or parity P) are written to spare 2 instead of disk #3.

Prior to commencing dynamic sparing, the parity Q for each stripe is stored in spare 1. This is because dynamic sparing is started when the error rate of a certain disk 321 exceeds threshold B, but when the error rate of this disk 321 exceeds threshold A, which is lower than threshold B, the parity Q for each stripe is created and stored in spare 1 for the above-described change from RAID 5 to RAID 6.

Figure 7:
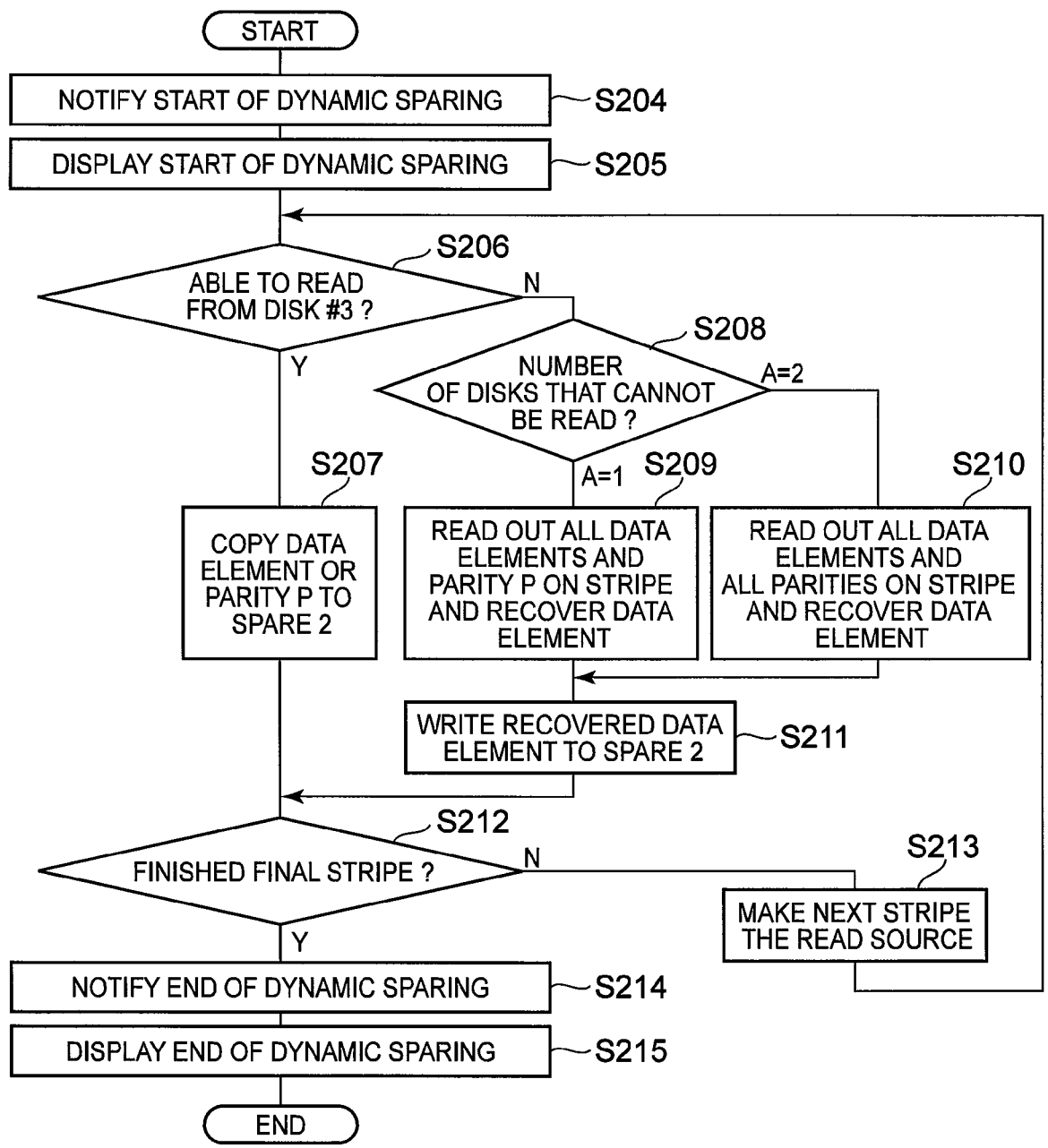
FIG. 7 is a flowchart of dynamic sparing in the first embodiment.

FIG. 7 is a flowchart of dynamic sparing.

Figure 33A:
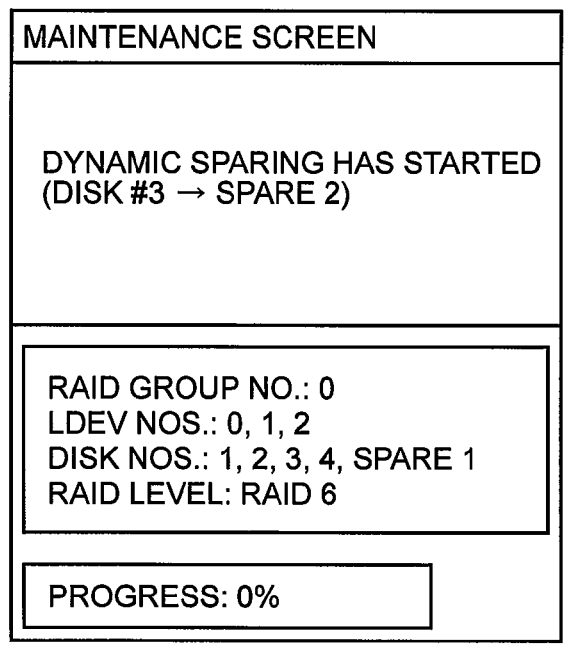
FIG. 33A shows the maintenance screen at the start of dynamic sparing.

The dynamic sparing execution program 31562 notifies the SVP 317 of information denoting the start of dynamic sparing (S204). This information, for example, comprises information denoting the disk 321 of the RAID group for which dynamic sparing will be started. The SVP 317 sends the information, which was obtained by analyzing the received information, and which denotes the disk of the RAID group for which dynamic sparing was started, to the maintenance terminal 600, and the maintenance terminal 600 displays this information on the maintenance screen (S205). An example of the maintenance screen displayed in S205 is shown in FIG. 33A.

When the dynamic sparing execution program 31562 accesses disk #3 to read out an information element from the stripe area of disk #3 (the disk 321 corresponding to the error rate, which exceeded threshold B) and reads out this information element (S206: YES), the read-out data element or parity 2 is written to spare 2 (S207).

If a failure occurs in disk #3 and it is impossible to read from disk #3 (S206: NO, S208: A=1), the dynamic sparing execution program 31562 reads information elements from at least three of the other disk #1, disk #2, disk #4 and spare 1 (no less than three information elements comprising at least one parity), uses the DRR circuit 3155 to recover the information element (data element or parity P) stored in disk #3 based on the no less than three read-out information elements (S209), and writes the recovered information element to spare 2 (S211).

If a failure also occurs in one more disk besides disk #3 and a read from this disk is impossible as well (S206: NO, S208: A=2), the dynamic sparing execution program 31562 reads the information elements from all the other disks, uses the DRR circuit 3155 to recover the information element stored in disk #3 based on the read-out information elements (S210), and writes the recovered information element to spare 2 (S211).

If there is a stripe for which the processing of S206 through S211 has not been carried out (S212: NO), the dynamic sparing execution program 31562 makes the next stripe the execution target (S213), and executes S206.

Figure 33B:
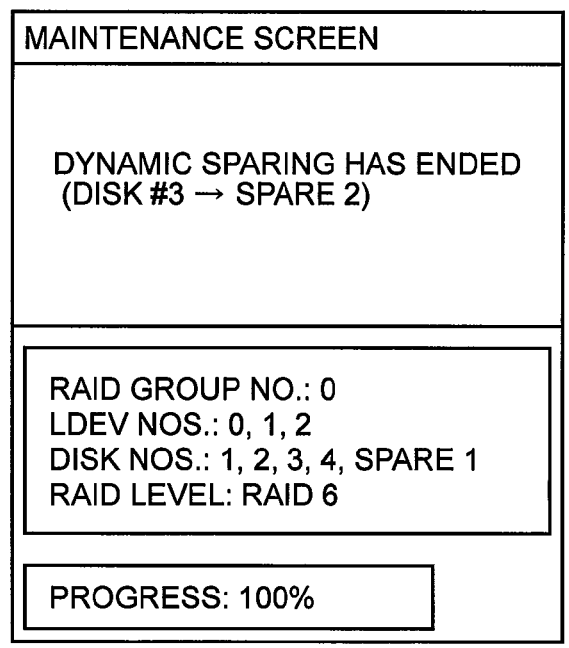
FIG. 33B shows the maintenance screen at the end of dynamic sparing.

Conversely, if the processing of S206 through S211 has been carried out for all the stripes (S212: YES), the dynamic sparing execution program 31562 notifies the SVP 317 of information denoting that dynamic sparing has ended (S214). The SVP 317 sends the information denoting the end of dynamic sparing to the maintenance terminal 600, and the maintenance terminal 600 displays this information on the maintenance screen (S215). FIG. 33B shows an example of the maintenance screen displayed in S215.

<<Copy-Back and RAID-DOWN Process>>

Copy-back, for example, is carried out by the RAID level control program 31561. Subsequent to the end of dynamic sparing, the RAID level control program 31561 blocks disk #3, which corresponds to the error rate exceeding threshold B.

Figure 8A:
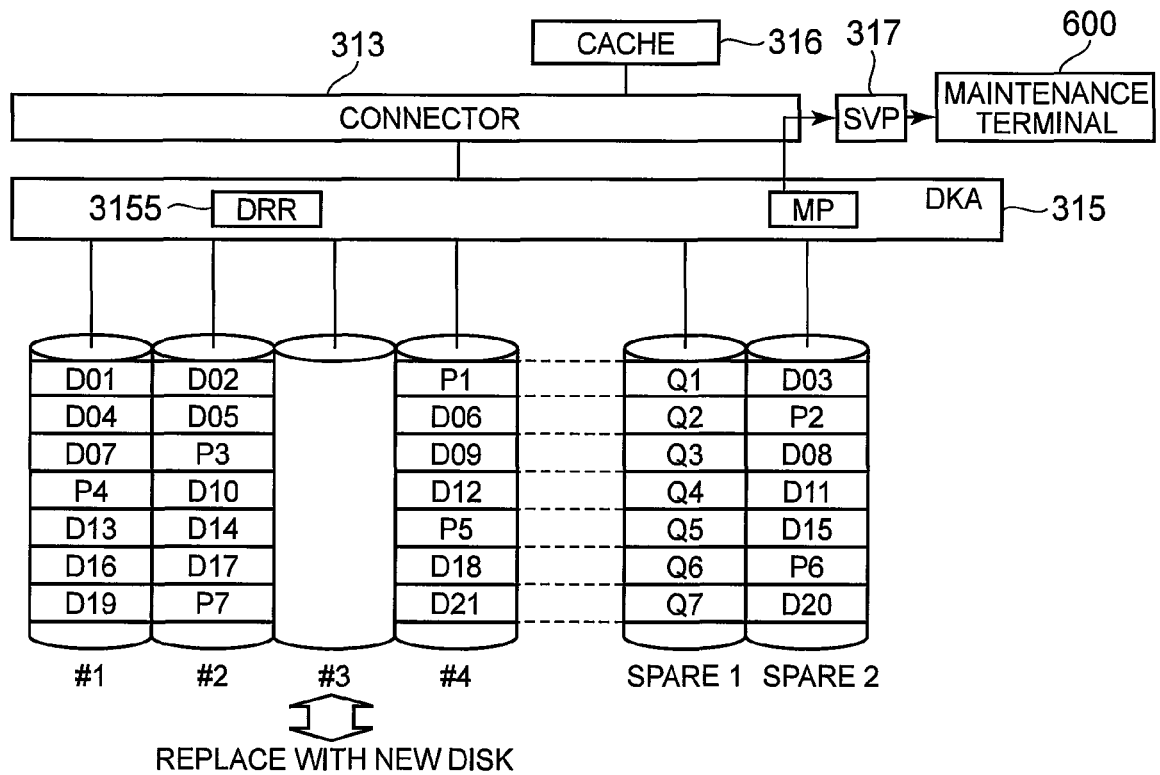
FIG. 8A shows the replacement of disk #3, which was blocked subsequent to dynamic sparing in the first embodiment.
Figure 8B:
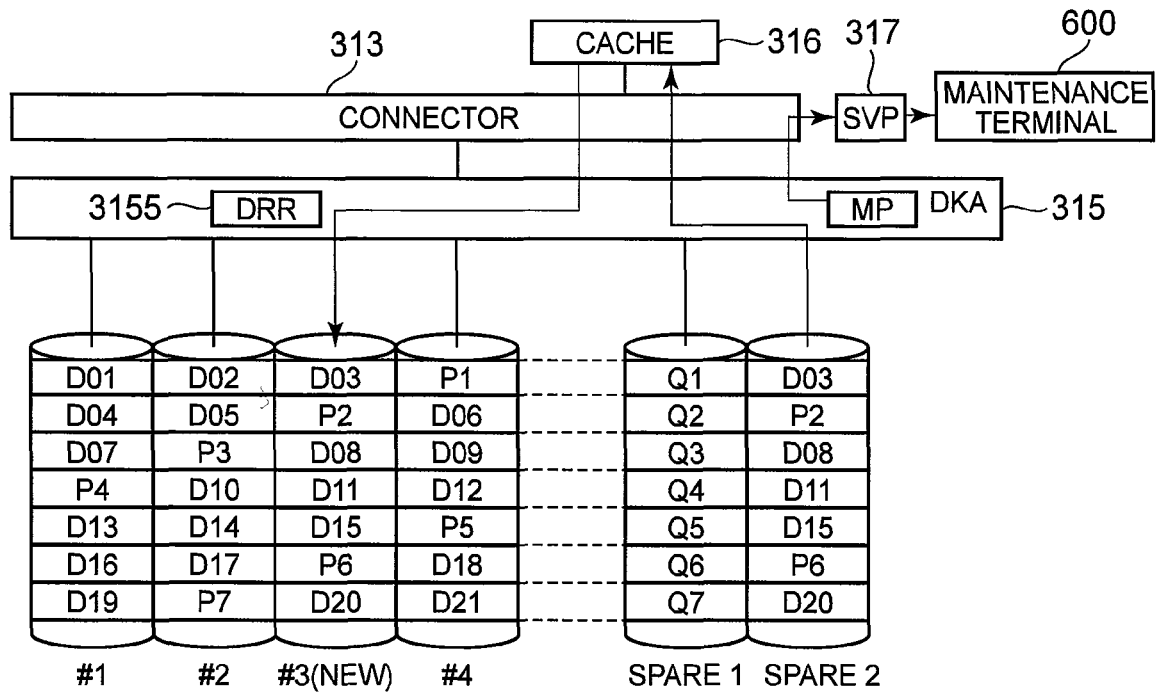
FIG. 8B is a conceptual diagram of a copy-back in the first embodiment when a read-out from spare 2 is possible.

The blocked disk #3, as shown in FIG. 8A, is replaced by a new disk by the user (the post-replacement disk of the blocked disk #3 will be called the "new disk #3"). The RAID level control program 31561, as shown in FIG. 8B, reads all data elements and parity from spare 2, and writes these data elements and parity to the new disk #3.

Figure 9A:
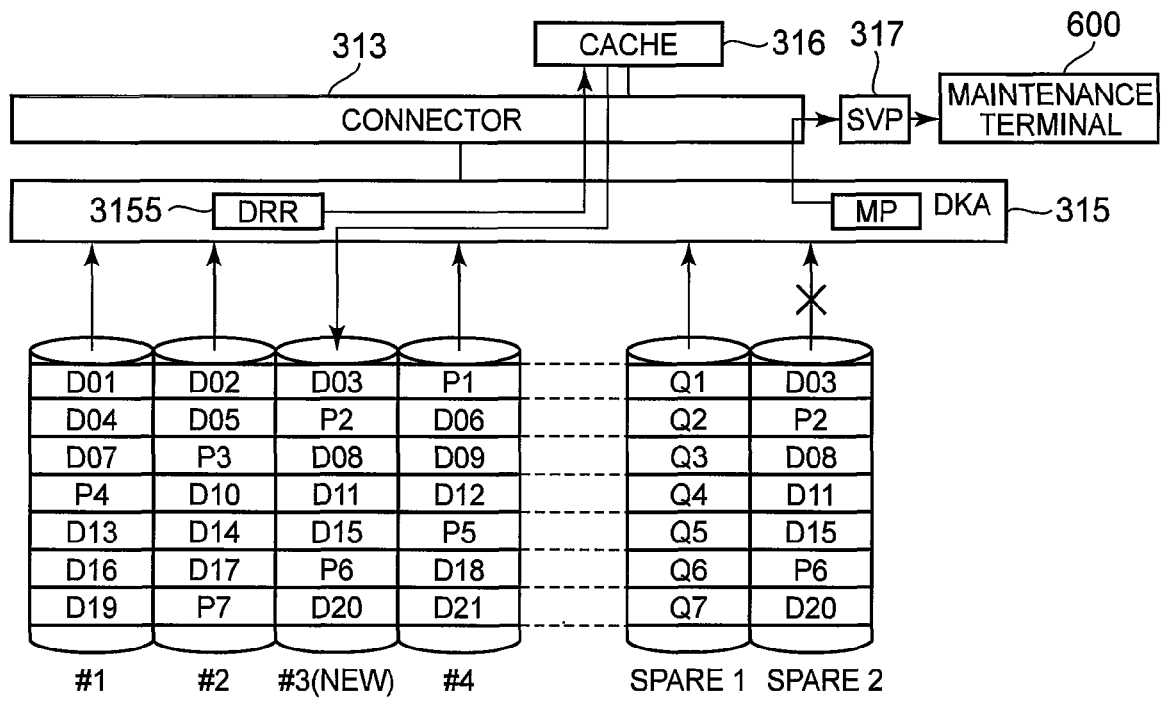
FIG. 9A is a conceptual diagram of a copy-back in the first embodiment when a read-out from spare 2 is not possible.

If a failure occurs in spare 2, and it becomes impossible to read out information elements from spare 2, the RAID level control program 31561 reads out information elements for each stripe from no less than three other disks constituting the RAID 6 RAID group, recovers the information element in spare 2, and writes this information element to the new disk #3 as shown in FIG. 9A, the same as in the processing for dynamic sparing.

Subsequent to writing all of the information elements stored in spare 2 to new disk #3, the RAID level control program 31561 starts a RAID-DOWN process. More specifically, for example, the RAID level control program 31561 updates the contents of the RAID level management table 3121 at an arbitrary point in time (for example, at the start of RAID-DOWN processing) from the contents shown in FIG.

21B to the contents shown in FIG. 22A (that is, the RAID level control program 31561 updates the RAID level status from "Established" to "RAID 6-5"). The RAID level control program 31561 returns the RAID level of the RAID group from RAID 6 to RAID 5 by removing spare 1 and spare 2 from the RAID group, and including new disk #3 as a member in this RAID group. More specifically, for example, the RAID level control program 31561 updates the contents of the LDEV management table 3122 from the contents comprising "spare 1" and "spare 2" for the LDEV in the RAID group (that is, from the contents shown in FIG. 23B) to contents comprising "disk #3" instead of "spare 1" and "spare 2" (that is, the contents of FIG. 3C). Further, for example, the RAID level control program 31561 changes the contents of the RAID level management table 3121 from the contents shown in FIG. 22A to the contents shown in FIG. 22B (changes the RAID level from "RAID 6" to "RAID 5", changes the disk configuration from "3D+1P+1Q" to "3D+1P", and changes the RAID level status from "RAID 6-5" to "Established").

Figure 9B:
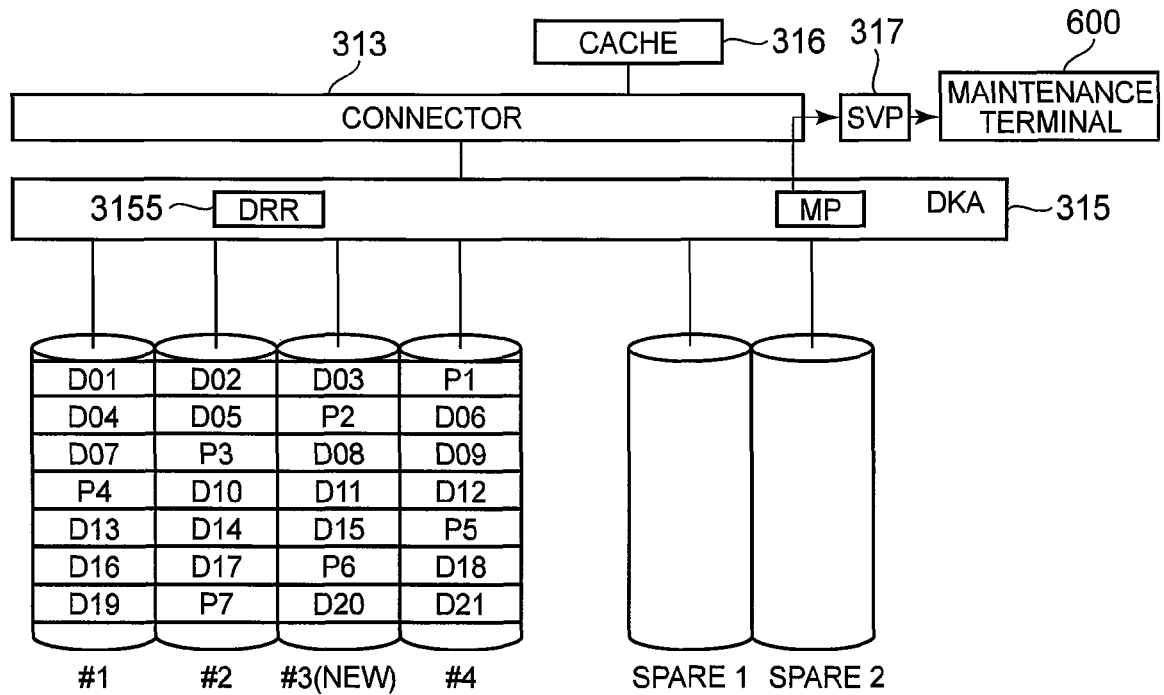
FIG. 9B shows a RAID group subsequent to changing from RAID 6 to RAID 5 in the first embodiment.

In accordance with the above-described flow, the RAID level of the RAID group returns from the temporary RAID 6 shown in FIG. 4B to the original RAID 5 as shown in FIG. 9B. Subsequent to the respective tables 3121 and 3122 being updated as described hereinabove, for example, when data is written to LDEV #0, which was formed on the basis of the RAID group that returned to RAID 5, the data elements and parity P based on this data are written to the respective stripe areas of disk #1 through disk #4, which comprise new disk #3.

Figure 30:
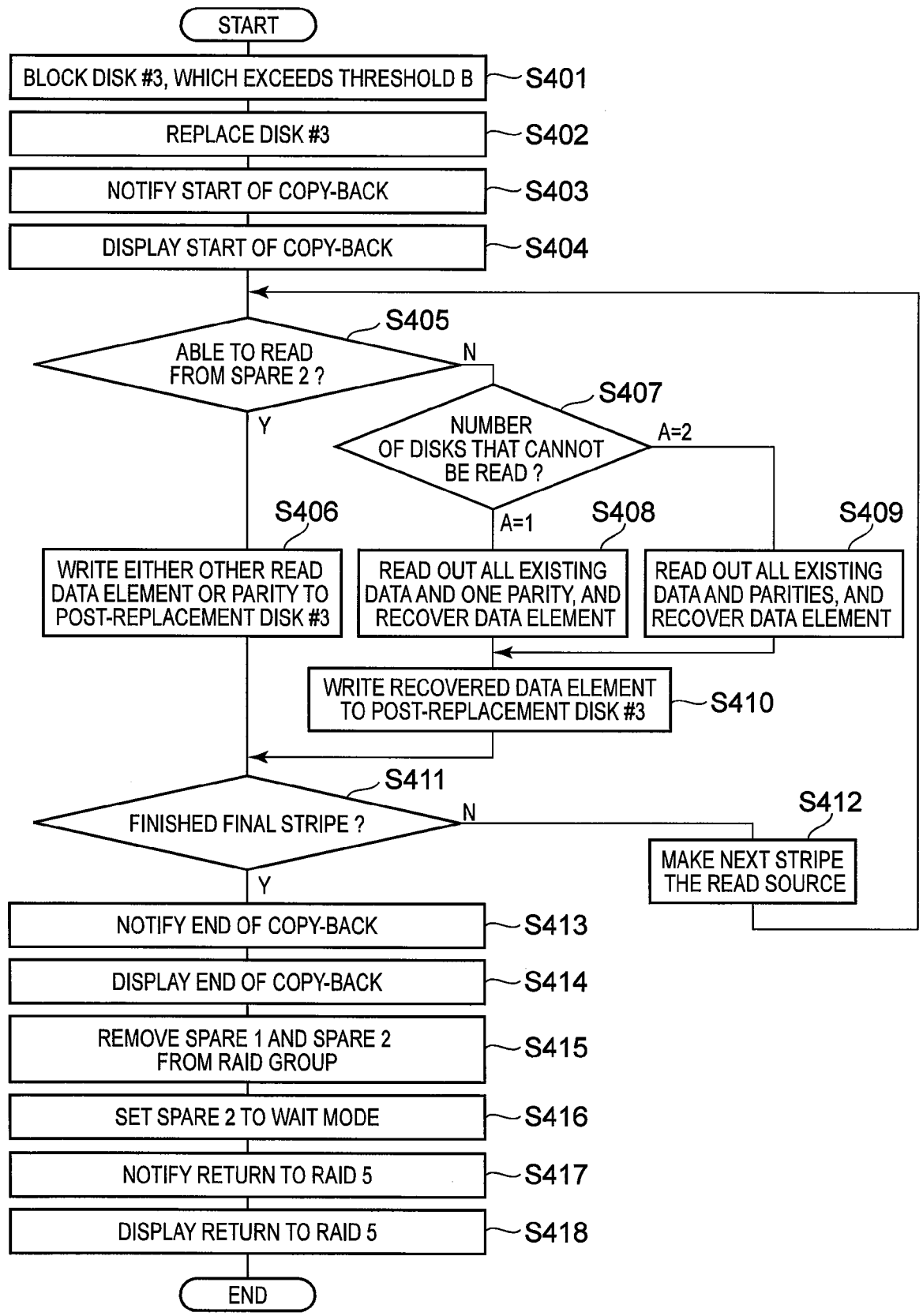
FIG. 30 shows the flows of copy-back and RAID-DOWN processes in the first embodiment.

FIG. 30 is a flowchart of a copy-back.

The RAID level control program 31561 blocks disk #3, which corresponds to an error rate exceeding threshold B, subsequent to the end of dynamic sparing (S401). The blocked disk #3 is replaced with a new disk #3 by the user (S402).

Figure 34C:
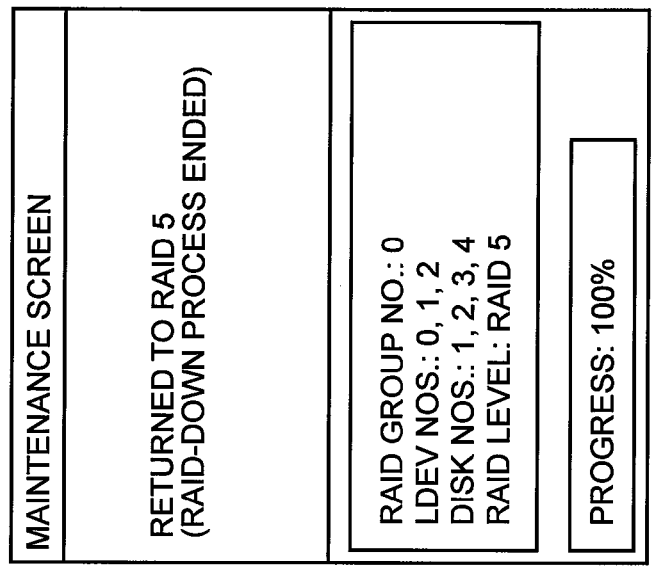
FIG. 34C shows the maintenance screen at the end of the change to RAID 5.
Figure 34B:
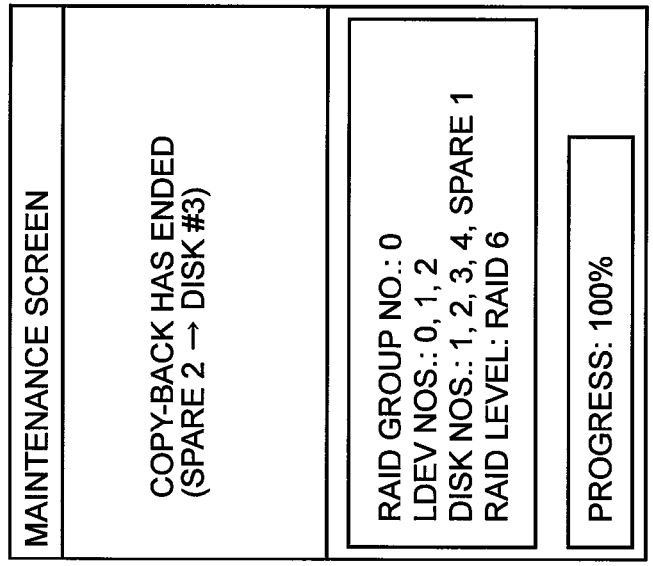
FIG. 34B shows the maintenance screen at the end of the copy-back.
Figure 34A:
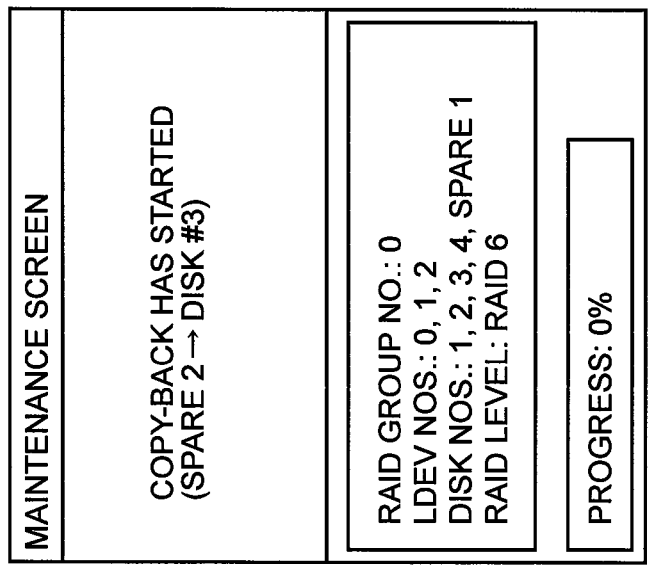
FIG. 34A shows the maintenance screen at the start of a copy-back.

The RAID level control program 31561 notifies the SVP 317 of information denoting the start of a copy-back (S403). This information, for example, comprises information denoting the disk 321 in the RAID group from which copy-back will be carried out to the new disk #3. The SVP 317 sends information, which was obtained by analyzing the received information, and which denotes the disk in the RAID group from which the copy-back will be carried out to new disk #3, to the maintenance terminal 600, and the maintenance terminal 600 displays this information (S404). An example of the maintenance screen displayed in S404 is shown in FIG. 34A.

The RAID level control program 31561 accesses spare 2 to read an information element from the stripe area of spare 2, and when the RAID level control program 31561 has read out this information element (S405: YES), the RAID level control program 31561 write the read-out information element to new disk #3 (S406).

If a failure occurs in spare 2 and it is impossible to read from spare 2 (S405: NO, S407: A=1), the RAID level control program 31561 reads information elements from at least three of the other disk #1, disk #2, disk #4 and spare 1 (no less than three information elements comprising at least one parity), uses the DRR circuit 3155 to recover the information element stored in spare 2 based on the read-out information elements (S408), and writes the recovered information element to new disk #3 (S410).

If a failure also occurs in one more disk besides spare 2 and a read from this disk is impossible as well (S405: NO, S407: A=2), the RAID level control program 31561 reads the information elements from all the other disks, uses the DRR circuit 3155 to recover the information element stored in spare 2 based on the read-out information elements (S409), and writes the recovered information element to new disk #3 (S410).

If there is a stripe for which the processing of S405 through S410 has not been carried out (S411: NO), the RAID level control program 31561 makes the next stripe the execution target (S412), and executes S405.

Conversely, if the processing of S405 through S410 has been carried out for all the stripes (S411: YES), the RAID level control program 31561 notifies the SVP 317 of information denoting that copy-back has ended (S413). The SVP 317 sends the information denoting the end of copy-back to the maintenance terminal 600, and the maintenance terminal 600 displays this information on the maintenance screen (S414). FIG. 34B shows an example of the maintenance screen displayed in S414.

The RAID level control program 31561 updates the LDEV management table 3122 to contents in which spare 1 and spare 2 are removed from the RAID group, and new disk #3 is included in the RAID group (S415). Further, the RAID level control program 31561 updates the status of spare 2 in the disk management table 3124 to "Waiting" (S416). The RAID level control program 31561 changes the RAID level in the RAID level management table 3121 from "RAID 6" to "RAID 5", changes the disk configuration from "3D+1P+1Q" to "3D+1P", changes the RAID level status from "RAID 6-5" to "Established", and notifies the SVP 317 of information denoting that the RAID level has returned to RAID 5 (S417). The SVP 317 sends the information denoting that the RAID level has returned to RAID 5 to the maintenance terminal 600, and the maintenance terminal 600 displays this information (S418). An example of the maintenance screen displayed in S418 is shown in FIG. 34C.

According to the preceding first embodiment, it is possible to use spare 1 to temporarily change from RAID 5 to RAID 6, and subsequent to a dynamic sparing and copy-back change, it is possible to return to RAID 5 from RAID 6. Spare 1 is a disk used in applications other than as a member of a RAID 6 RAID group. It is therefore possible to cut down the number of disks required initially compared to making a RAID group RAID 6 at all times.

Further, according to the first embodiment, the changing of a RAID level as described hereinabove is carried out while online. In other words, I/O restrictions, such as staticizing the host computer 100 (more specifically, for example, the application program issuing an I/O), or having the storage system 300 refuse the receipt of an I/O command (for example, returning a prescribed response, such as an error or busy signal when an I/O command is received), is not necessary even when a RAID level change is to be carried out. That is, a RAID level change can be carried out in parallel to receiving an I/O command from the host computer 100.

Further, according to the first embodiment, error rate threshold A, which is lower than error rate threshold B for determining whether or not dynamic sparing will be executed, is provided, and a change from RAID 5 to a temporary RAID 6 is carried out triggered by the fact that the error rate of a certain disk has exceeded this error rate threshold A. Thus, because a second parity is also provided prior to the start of dynamic sparing, dynamic sparing can be continued and brought to a successful conclusion even if a failure occurs in two of second disks 321 in a single RAID group while dynamic sparing is in progress.

Second Embodiment

A second embodiment of the present invention will be explained. Mainly the points of difference with the first embodiment will be explained below, and explanations of the points in common with the first embodiment will be either omitted or abbreviated (The same will apply to the third and subsequent embodiments explained hereinbelow.).

In the second embodiment, a choice is made as to whether or not to carry out a RAID-DOWN process, which returns the RAID level from RAID 6 to RAID 5. This choice can be made either by the user of the maintenance terminal 600, or by the DKA 315.

Figure 32:
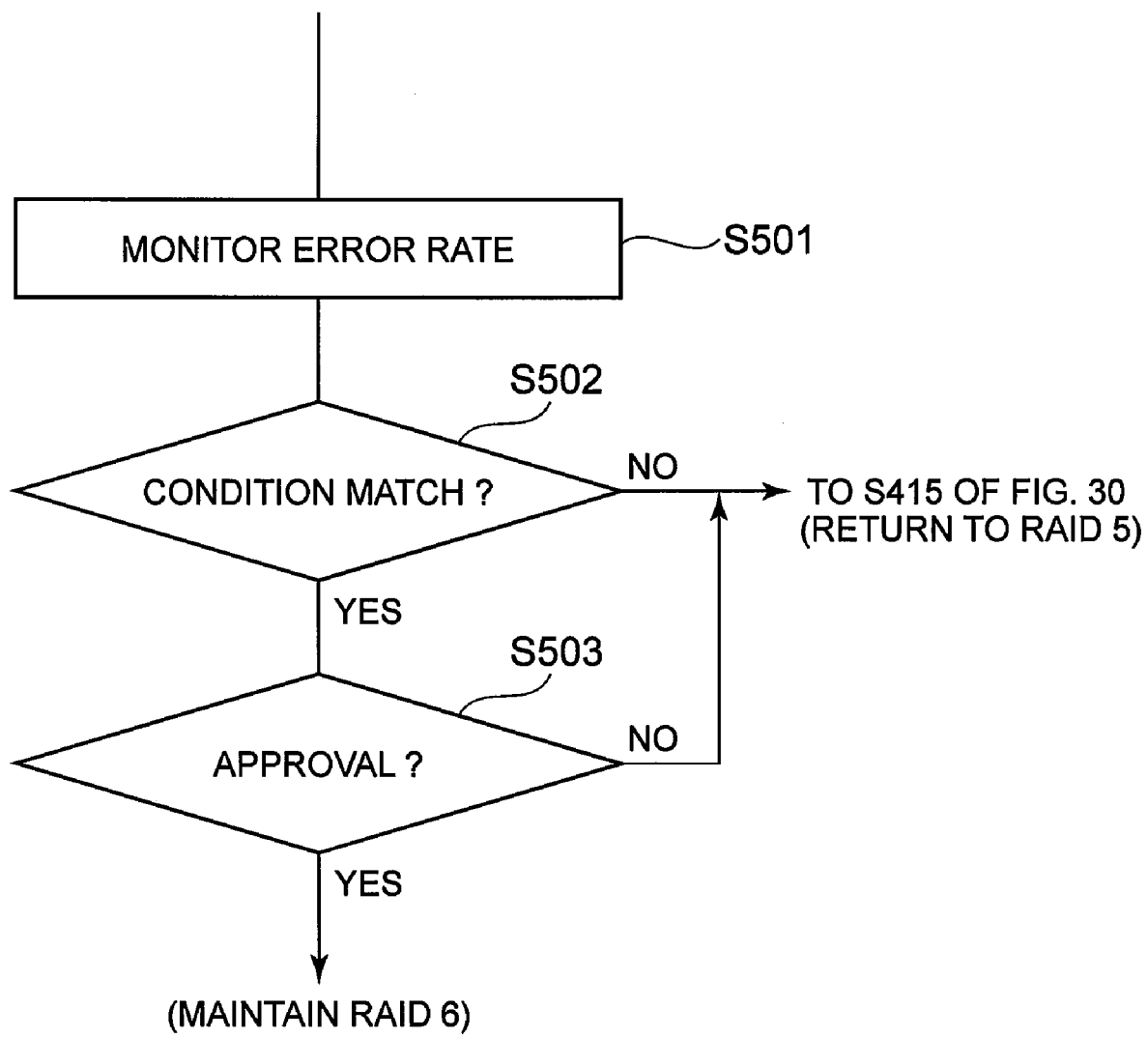
FIG. 32 shows the flow for selecting to either maintain RAID 6 or return to RAID 5 in a second embodiment of the present invention.

For example, the RAID level control program 31561 does not carry out S415 immediately after S414 of FIG. 30, but rather monitors the disk management table 3124 as illustrated in FIG. 32 (S501). When the result of this monitoring coincides with a prescribed condition (D502: YES), the RAID level control program 31561 sends a message recommending the continuation of RAID 6 and a request for approval to the maintenance terminal 600 via the SVP 317. Upon receiving approval from the user via the maintenance terminal 600 by way of the SVP 317 (S503: YES), the RAID level control program 31561 maintains RAID 6 (that is, the RAID group constituting disk #1, disk #2, disk #4, spare 1 and spare 2, and RAID 6 (3D+1P+1Q) are maintained.). In other words, the RAID level control program 31561 returns to RAID 5 subsequent to S414 of FIG. 30 when the above-mentioned prescribed condition is not met.

For example, the following (Condition 1) and/or (Condition 2) can be used as the prescribed condition here.

(Condition 1) The error rates of disks other than the replaced disk are high overall.

Subsequent to returning the configuration to RAID 5, it is possible that the error rate of another disk 321 inside the same RAID group will exceed threshold A within a short period of time. In this case, it becomes necessary to once again compute a second parity for each stripe in order to change from RAID 5 to RAID 6. Thus, a burden is placed on the DKA 315. Accordingly, (Condition 1) is applied.

As a first concrete example, the RAID level control program 31561 determines that (Condition 1) has been met if it is detected that the error rates of disks other than the post-replacement new disk #3 exceed a prescribed value, which is lower than threshold A (for example, a value one half that of threshold A).

As a second concrete example, the RAID level control program 31561 totals the error rates of all the disks other than the post-replacement new disk #3 in the RAID group, and determines that (Condition 1) has been met if this total exceeds threshold B.

(Condition 2) The error rate of post-replacement new disk #3 reaches either threshold A or a prescribed value lower than threshold A within a prescribed period of time after dynamic sparing has ended (for example, within a time period specified beforehand by the user via the maintenance terminal 600).

Subsequent to the implementation of dynamic sparing, it is possible for errors to occur often in the post-replacement new disk for reasons such as the fact that the post-replacement new disk is not a new product. In this case, there is the possibility that the error rate of the post-replacement new disk will directly exceed threshold A, and for this reason, it become necessary once again to compute a second parity for each stripe to change from RAID 5 to RAID 6. Accordingly, (Condition 2) is applied.

The preceding is an explanation of the second embodiment. Furthermore, in the second embodiment, for example, the maintenance terminal 600 user configures in the DKA 315 beforehand a mode for maintaining RAID 6, which was changed from RAID 5 to RAID 6 (RAID 6 retention mode), and this RAID 6 retention mode can be cancelled arbitrarily.

Third Embodiment

In a third embodiment, in a RAID-UP process, an information element stored in disk #3, the error rate for which has exceeded threshold A, is moved to spare 1, and parity Q is written to disk #3. Consequently, the RAID level is changed from RAID 5, which is configured from disk #1 through disk #4, to RAID 6, which is configured from disk #1 through disk #4 and spare 1. If the error rate of disk #3 exceeds threshold B thereafter, the RAID level is returned from RAID 6 to RAID 5 by removing disk #3 from the members of the RAID group. In other words, dynamic sparing and copy-back are not required.

Figure 11A:
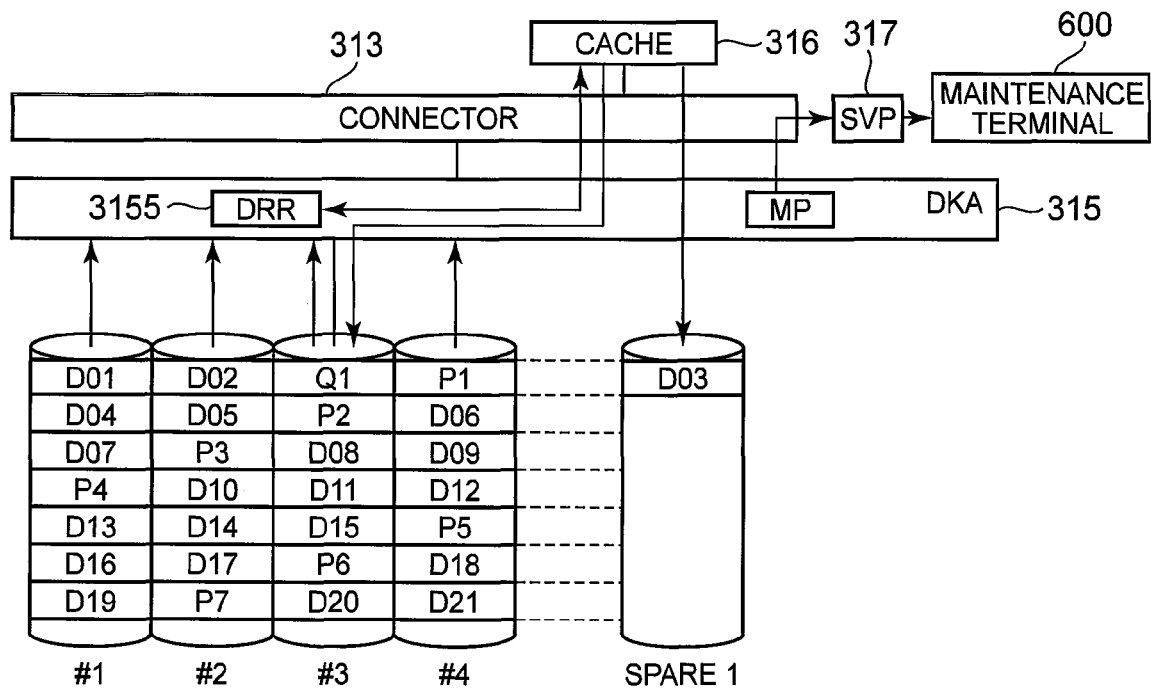
FIG. 11A is a conceptual diagram of a parity Q1 write in a third embodiment of the present invention.

More specifically, as shown in FIG. 11A, in a RAID-UP process, the RAID level control program 31561 carries out the following processing for each stripe. For example, for the first stripe, the RAID level control program 31561 reads out data elements D01, D02, D03 and parity P1 from disk #1 through disk #4, and of these, writes write data element D03, which was read out from disk #3, to the stripe area of the first stripe of spare 1. Further, the RAID level control program 31561 uses the DRR circuit 3155 to acquire parity Q1 based on the above read-out data elements D01, D02, D03 and parity P1, and overwrites the stripe area in which data element D03 is stored in disk #3 with the acquired parity Q1.

Figure 11B:
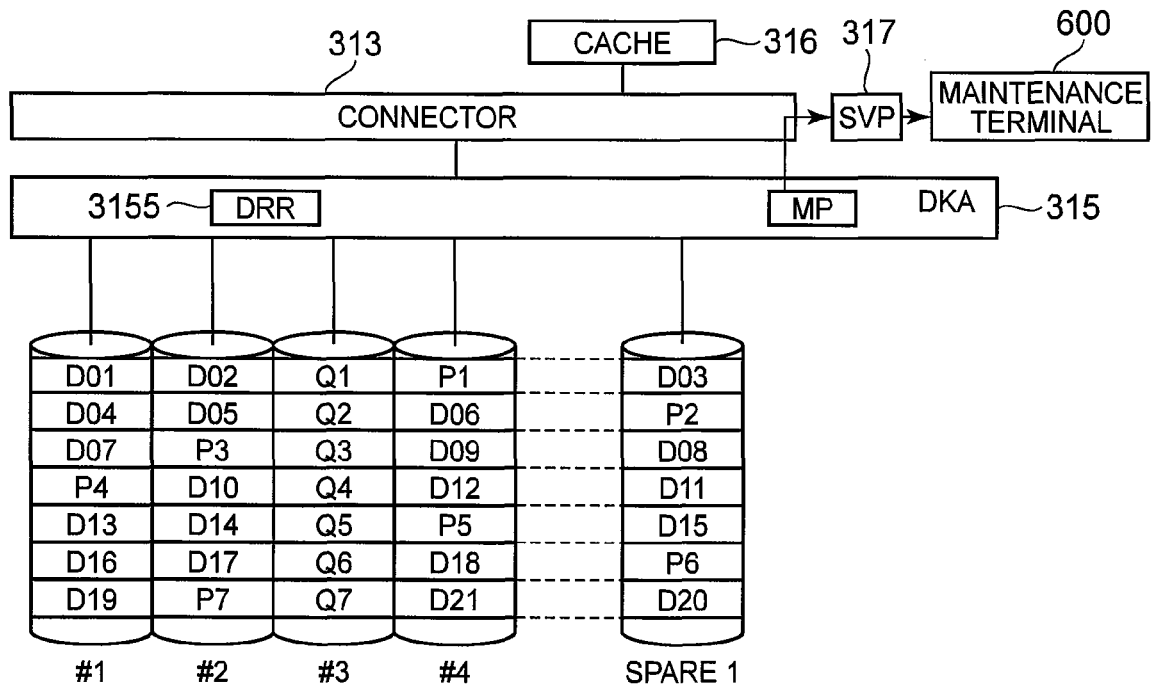
FIG. 11B is a conceptual diagram of the state subsequent to the parity Q write in the third embodiment.

As shown in FIG. 11B, all of the information elements stored in disk #3 are stored in spare 1 by carrying out processing such as that described above for each stripe, and the respective stripe parities Q stored in spare 1 in the first embodiment are stored in disk #3.

Figure 13:
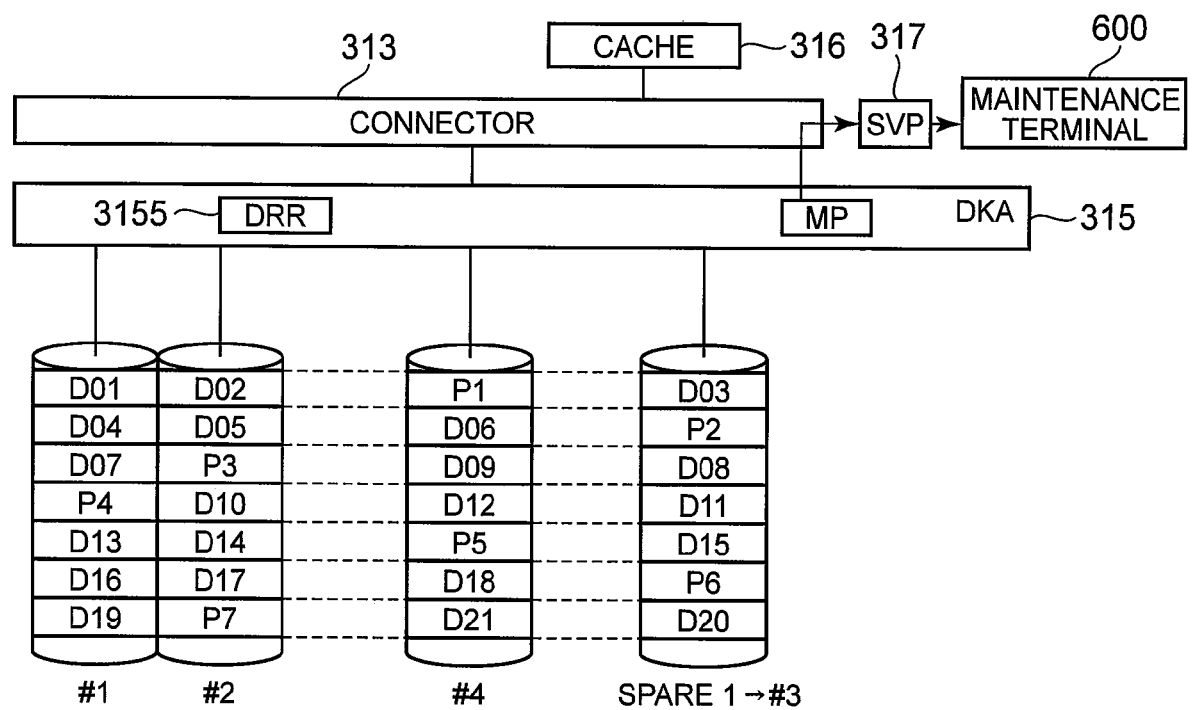
FIG. 13 is a conceptual diagram of a RAID group, which returned to RAID 5 in the third embodiment.

In the third embodiment, when the error rate of disk #3 exceeds threshold B, the RAID level control program 31561 blocks disk #3 as shown in FIG. 12 (S601). The blocked disk #3 is removed from the storage system 300 by the user (S602). The RAID level control program 31561 removes "spare 1" from the members of the RAID group, and allocates "disk #3" to the disk 321 to which "spare 1" had been allocated (S603). Consequently, the RAID configuration returns from RAID 6, which is configured by disk #1 through disk #4 and spare 1, to RAID 5, which is configured from disk #1 through disk #4 (Refer to FIG. 13). However, the disk 321 to which "disk #3" is allocated will differ before and after the change from RAID 6 to RAID 5.

The RAID level control program 31561 notifies the SVP 317 of information denoting the return from RAID 6 to RAID 5 (S604). The SVP 317 sends the information denoting the return from RAID 6 to RAID 5 to the maintenance terminal 600, and the maintenance terminal 600 displays this information (S605).

According to the third embodiment above, it is possible to get by with only one available spare disk 321, and there is no need to carry out a dynamic sparing-based copy, nor a copy-back subsequent to replacing a disk. In the third embodiment, it is possible to return from RAID 6 to RAID 5 by simply blocking disk #3, to which parity Q has been written, and removing disk #3 from the RAID group.

Fourth Embodiment

In a fourth embodiment, the parity Q for each stripe is distributed to a plurality of spare disks 321.

Figure 14A:
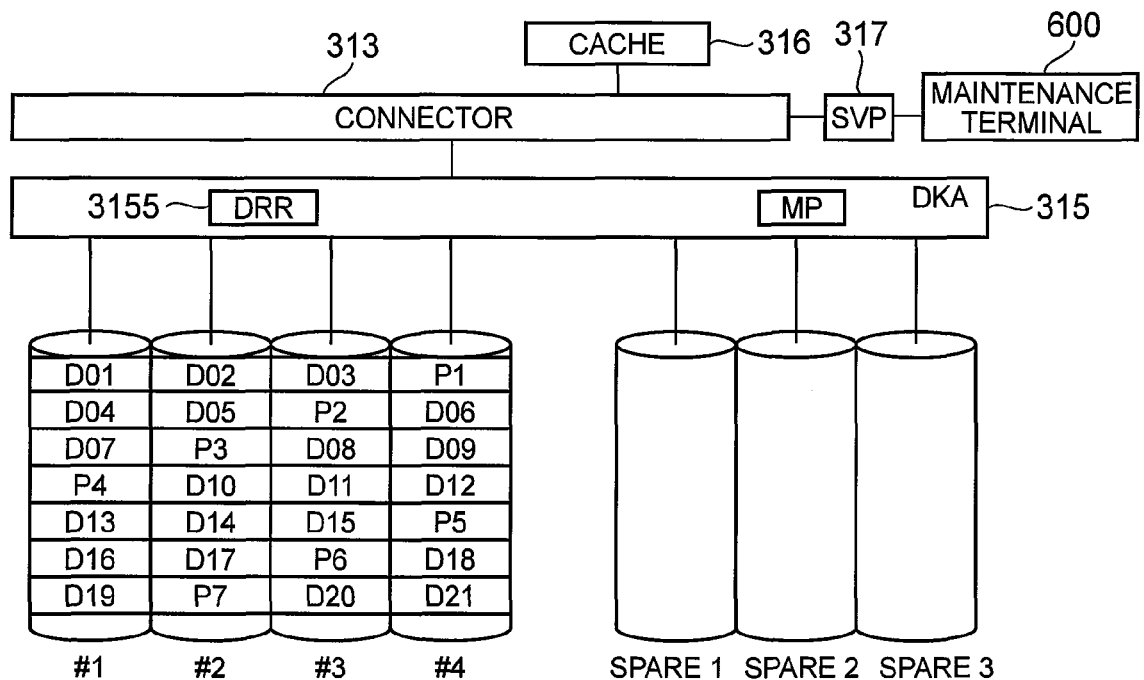
FIG. 14A is a conceptual diagram of a RAID group and spare disks prior to the start of a RAID-UP process in a fourth embodiment of the present invention.
Figure 14B:
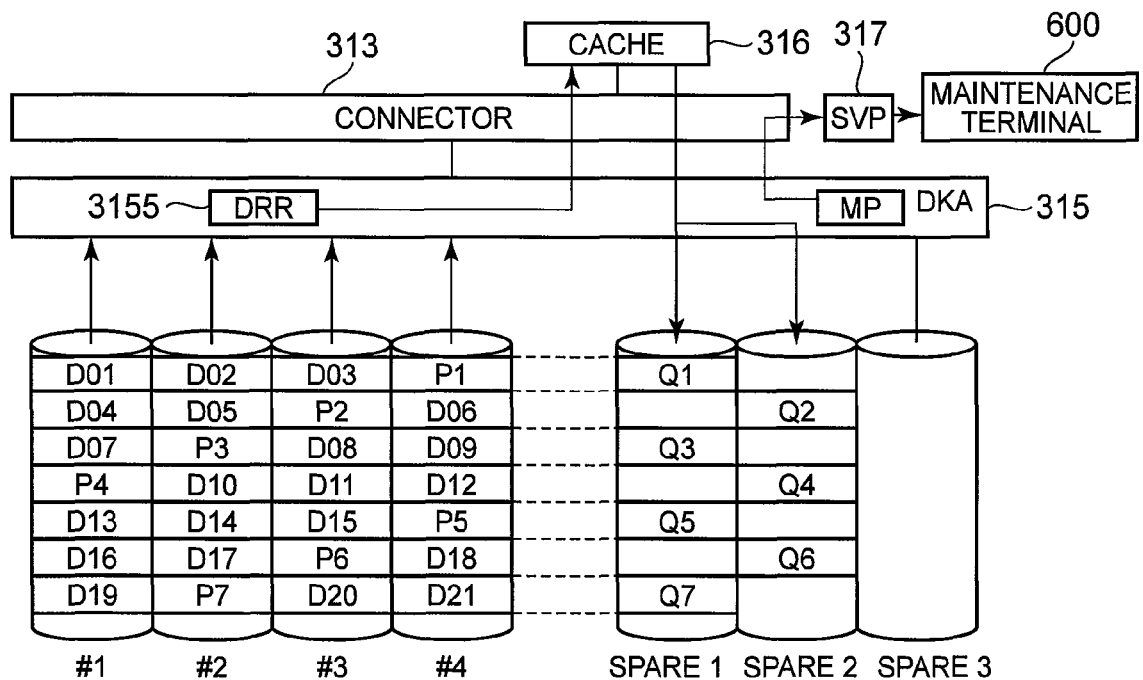
FIG. 14B is a conceptual diagram of a parity Q write in the RAID-UP process of the fourth embodiment.

For example, as shown in FIG. 14A, three spare disks (spare 1, spare 2, spare 3) are provided, and as shown in FIG. 14B, spare 1 and spare 2 thereof are used as parity Q write destinations. Spare 1 and spare 2, for example, are respectively used as parity Q write destinations with equal frequency. More specifically, for example, the RAID level control program 31561 alternately changes the parity Q write destination.

Figure 15A:
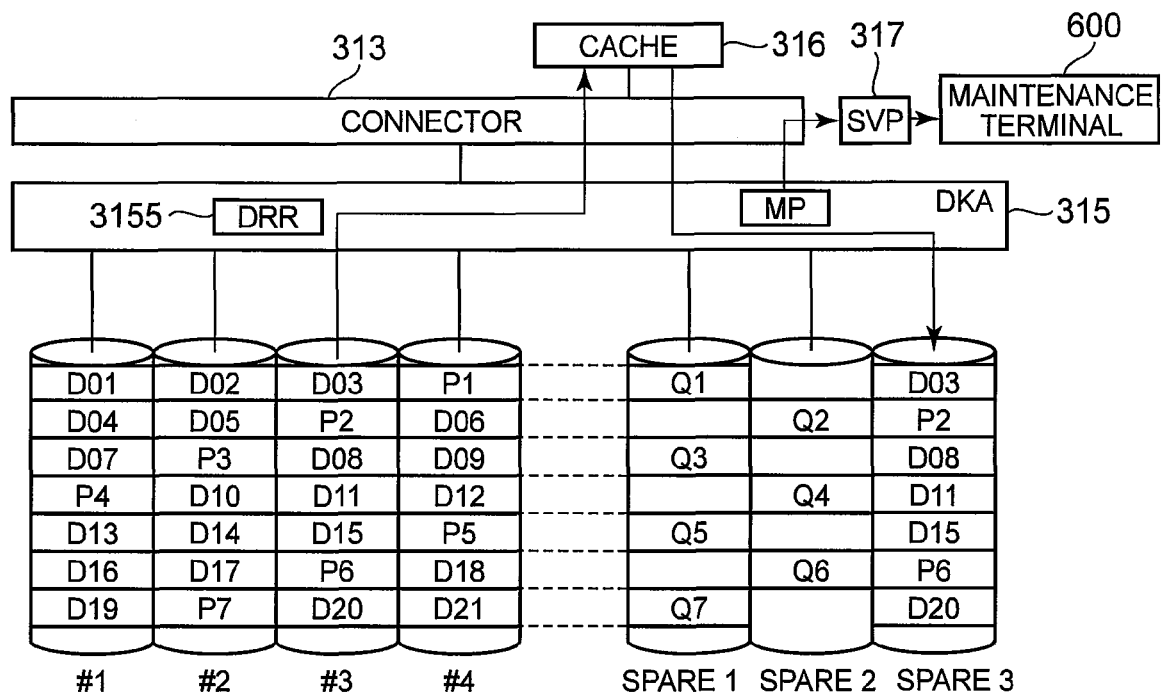
FIG. 15A is a conceptual diagram of dynamic sparing in the fourth embodiment.
Figure 15B:
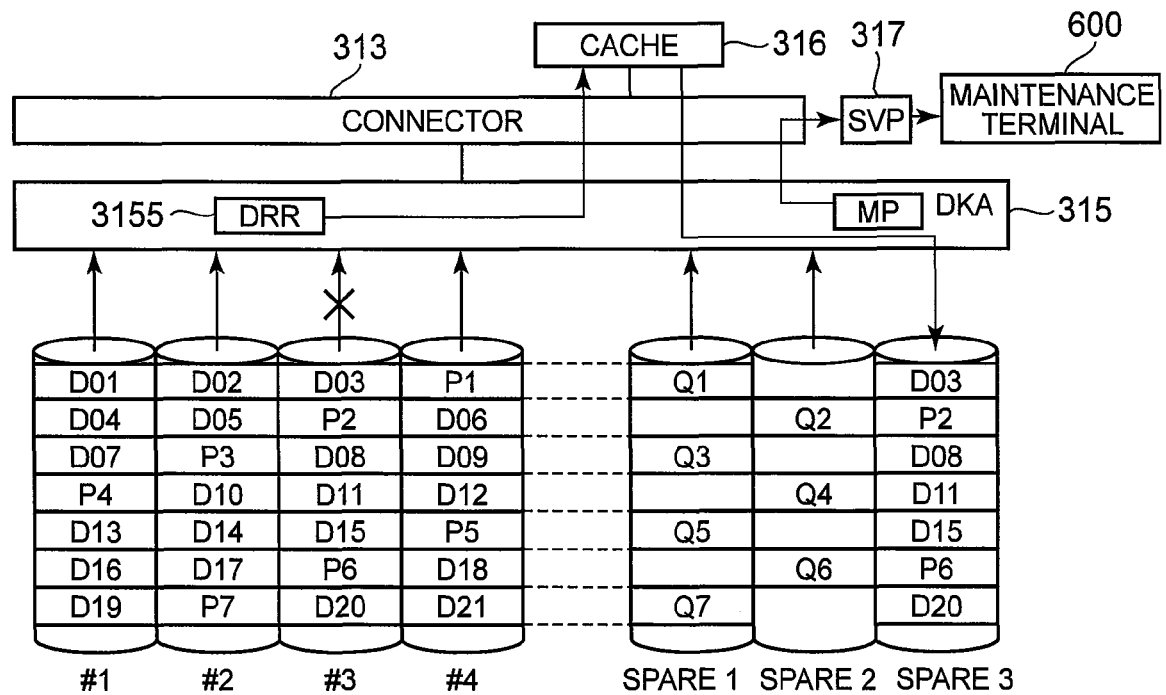
FIG. 15B is a conceptual diagram of dynamic sparing in the fourth embodiment when a read-out from disk #3 is not possible.

Furthermore, in the fourth embodiment, in dynamic sparing, an information element stored in disk #3, for which the error rate exceeded threshold B, is copied to the unused spare (spare 3 here) as shown in FIG. 15A the same as in the first embodiment. If, as shown in FIG. 15B, it is not possible to read from disk #3 (and one other disk), information elements are read from all the other disks, the information element stored in disk #3 is recovered based on the read-out information elements, and the recovered information element is written to spare 3.

According to this fourth embodiment, it is possible to avoid concentrating writes to one spare disk in a change to RAID 6.

Fifth Embodiment

In a fifth embodiment, the second parity write destination is distributed the same as in the fourth embodiment. However, the distribution destinations are not a plurality of spares, but rather are one spare and no less than two disks constituting the members of the RAID group.

Figure 16A:
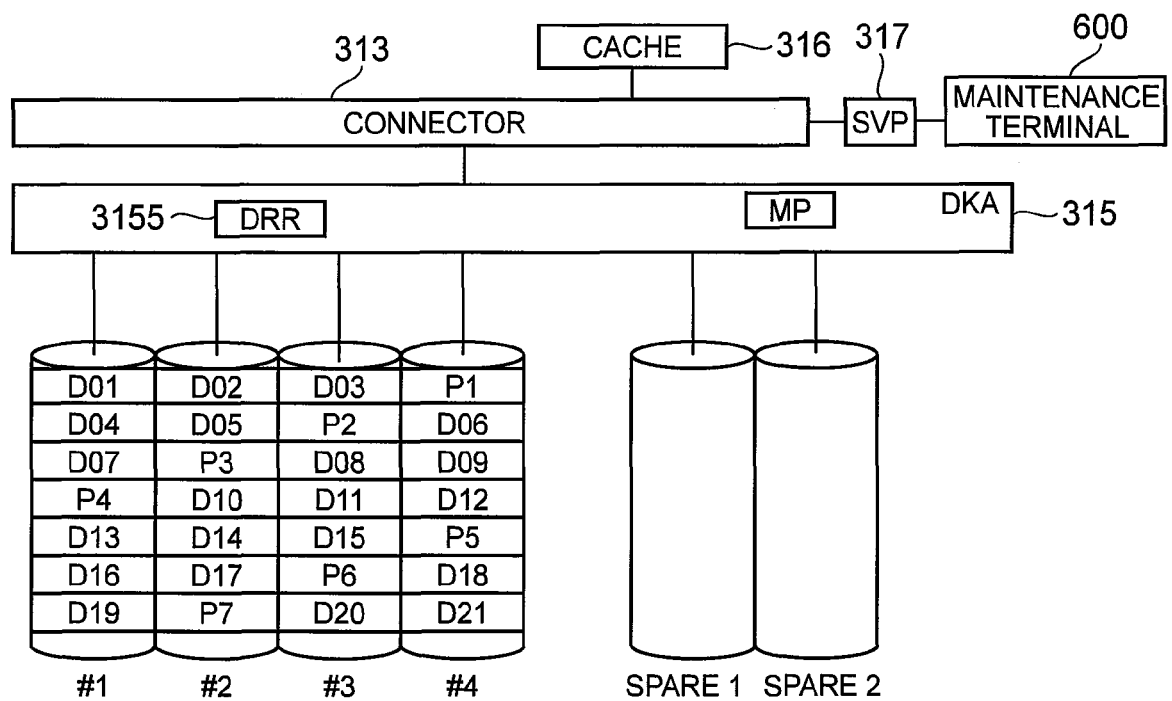
FIG. 16A is a conceptual diagram of the RAID group and spare disks prior to the start of a RAID-UP process in a fifth embodiment of the present invention.
Figure 16B:
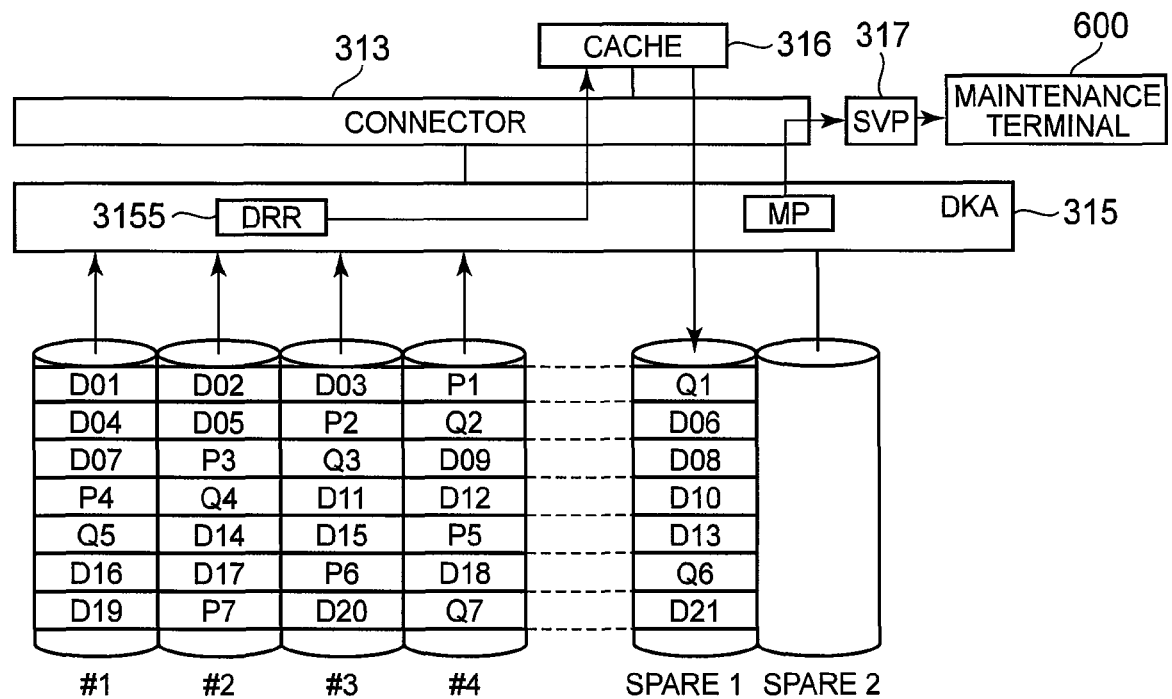
FIG. 16B is a conceptual diagram of a parity Q write in RAID-UP processing in the fifth embodiment.

For example, as shown in FIG. 16A, spare 1 and spare 2 are provided. The RAID level control program 31561 reads out a plurality of information elements for each stripe, uses the DRR circuit 3155 to generate parity Q based on this plurality of information elements, and writes parity Q to spare 1. If parity Q is written to an existing member (disk) of the RAID group, the existing information element in this member disk is written to spare 1, and the stripe area, in which this information element is stored, is overwritten with parity Q (Refer to FIG. 16B).

In accordance with the above, the second parity write destination switches in order from spare 1→disk #4→disk #3→disk #2→disk #1, and subsequent to disk #1 returns to spare 1.

Figure 17A:
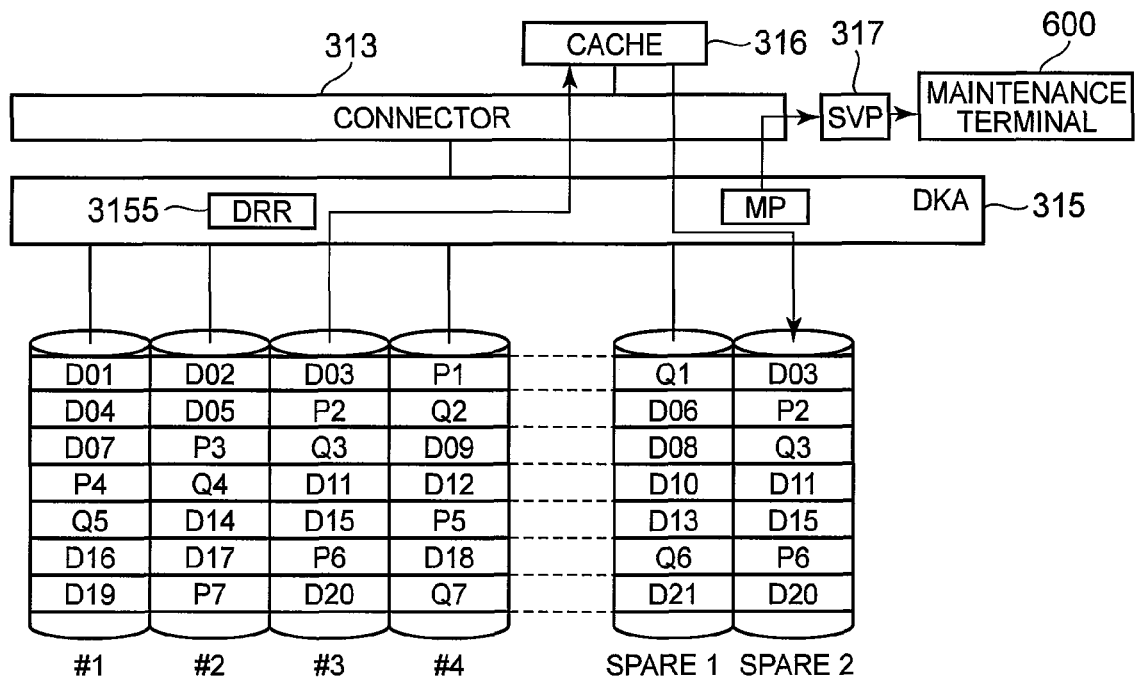
FIG. 17A is a conceptual diagram of dynamic sparing in the fifth embodiment.
Figure 17B:
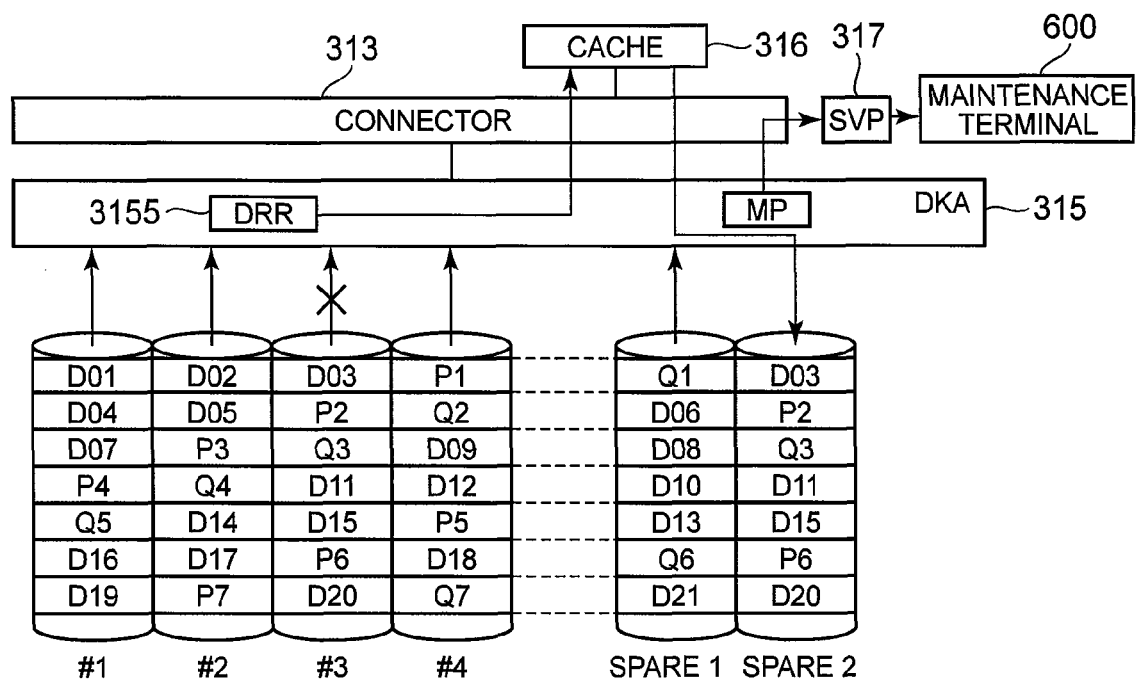
FIG. 17B is a conceptual diagram of dynamic sparing in the fifth embodiment when a read-out from disk #3 is not possible.

Furthermore, in the fifth embodiment, in dynamic sparing, the information element stored in disk #3, for which the error rate exceeded threshold B, is copied to the unused spare (spare 2 here) as shown in FIG. 17A the same as in the first embodiment. If, as shown in FIG. 17B, it is not possible to read from disk #3 (and one other disk), information elements are read from all the other disks, the information element stored in disk #3 is recovered based on the read-out plurality of information elements, and the recovered information element is written to spare 2.

Figure 18A:
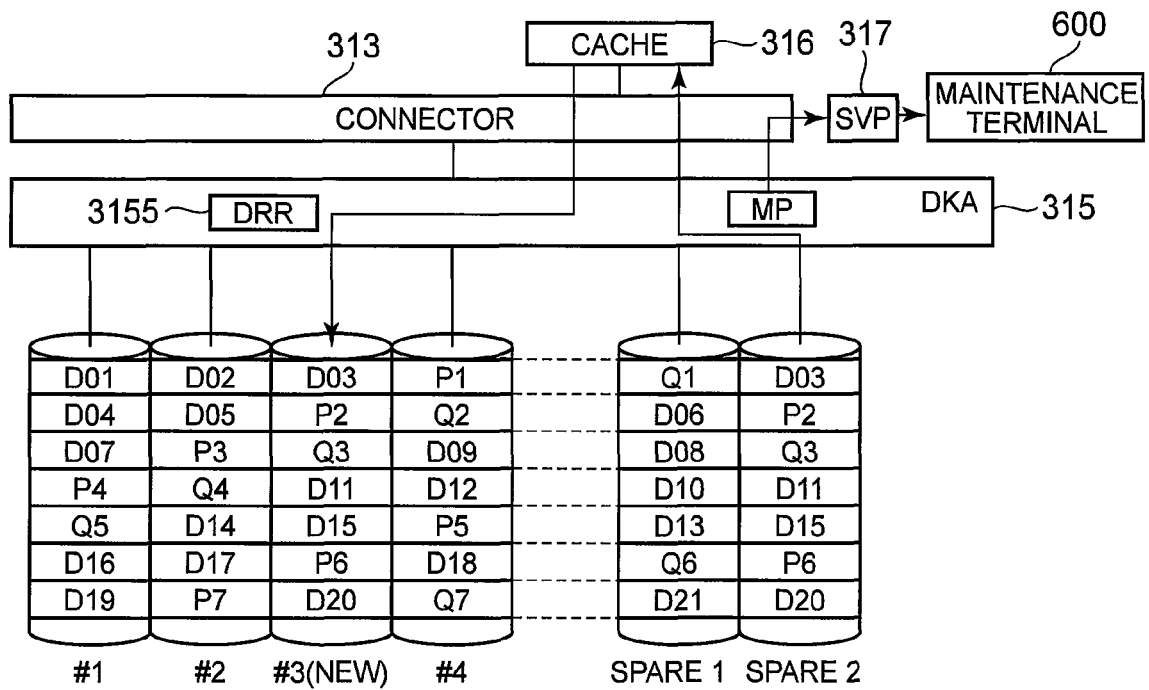
FIG. 18A is a conceptual diagram of a copy-back in the fifth embodiment.
Figure 18B:
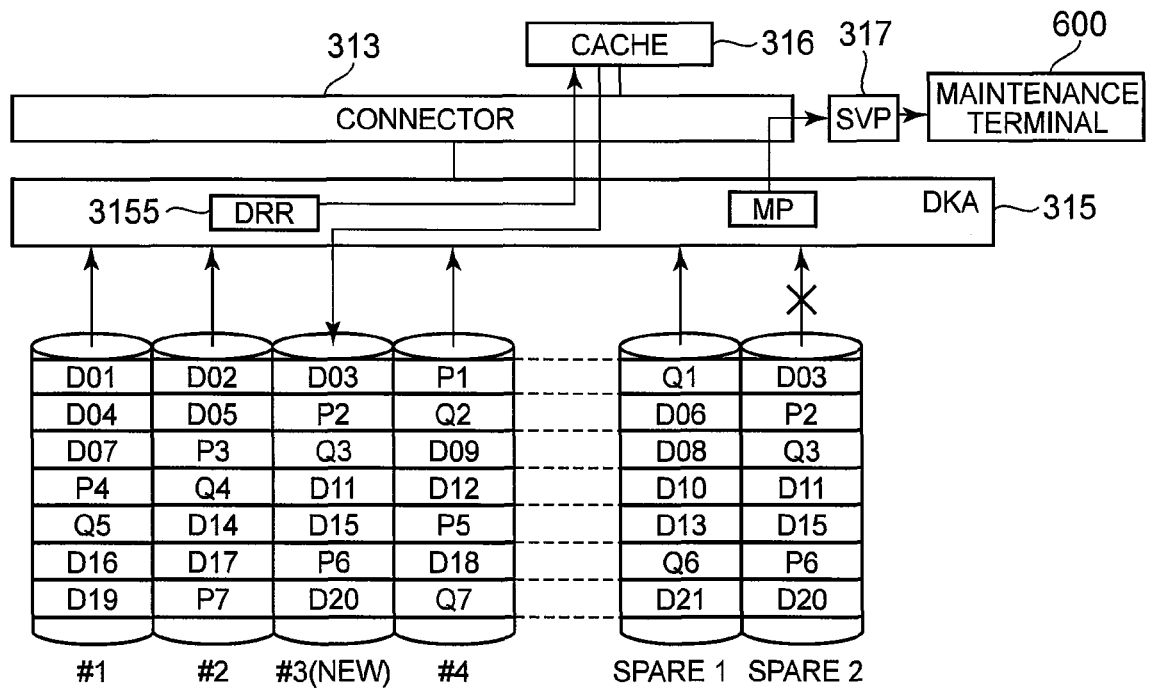
FIG. 18B is a conceptual diagram of a copy-back in the fifth embodiment when a read-out from spare 2 is not possible.
Figure 19:
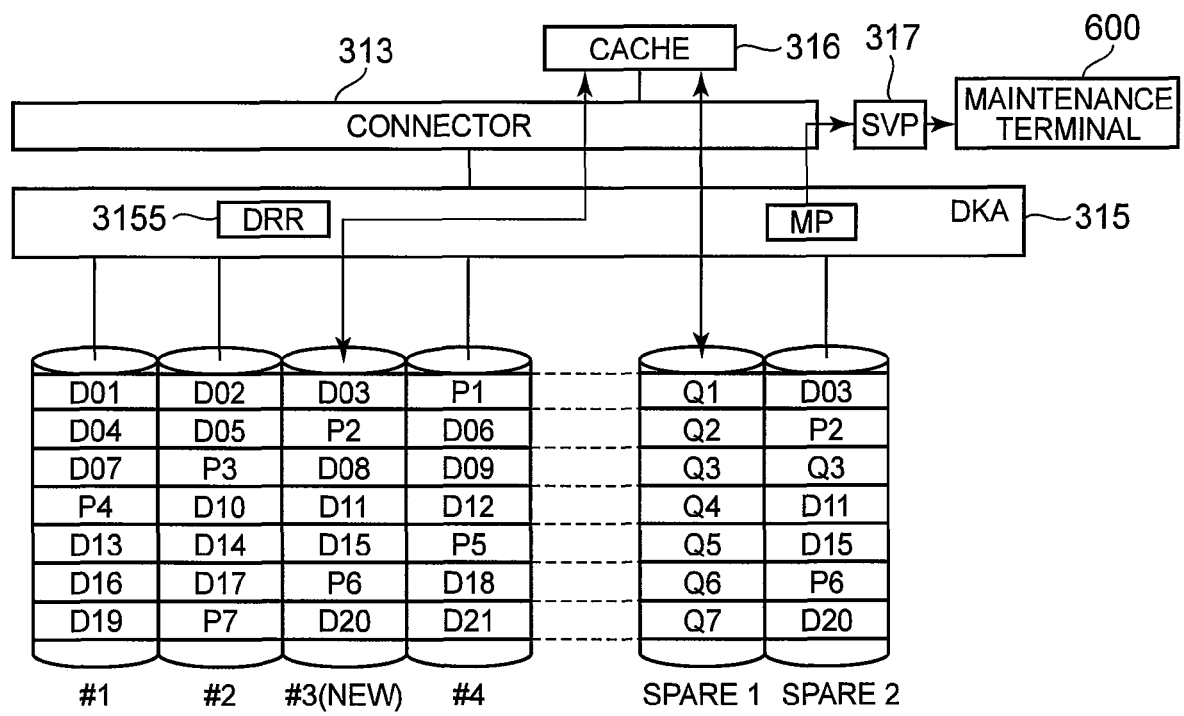
FIG. 19 is a conceptual diagram of the consolidation of second parities in spare 1.

Further, in the fifth embodiment, a copy-back is carried out from spare 2 to new disk #3 as shown in FIG. 18A. If spare 2 cannot be read, a recovery, which uses another disk, is carried out as shown in FIG. 18B. Then, in order to from RAID 6 to RAID 5, there is no longer a need for one disk. Here, the respective information elements other than parity Q stored in spare 1 are replaced with the parity Q stored in disk #1 through disk #4 in the RAID group. Consequently, parity Q is concentrated in spare 1 as shown in FIG. 19. Thereafter, the configuration change from RAID 6 to RAID 5 becomes complete by removing spare 1 from the members of the RAID group.

Sixth Embodiment

Figure 20A:
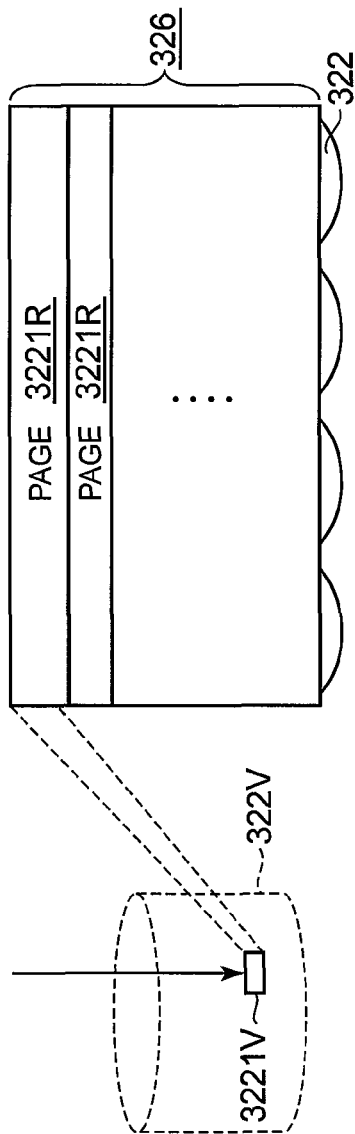
FIG. 20A is a conceptual diagram of a capacity expansion process in a sixth embodiment of the present invention.

In a sixth embodiment, the storage system 300 has a function for providing the host computer 100 with a virtual volume (for convenience sake, called "capacity expansion volume" hereinafter) 322V in accordance with Thin Provisioning technology as shown in FIG. 20A. The storage system 300 has a pool 326 constituted by a plurality of LDEV 322, and the pool 326 has a plurality of real storage areas (for convenience sake, called "pages" hereinafter) 3221R. Shared memory 312 stores mapping information (not shown in the figure) denoting which page 3221R is allocated to which virtual storage area (hereinafter virtual area) 3221V in the capacity expansion volume. The CHA 311, upon receiving a write command specifying a virtual area 3221V, references the mapping information, and if a page 3221R has not been allocated to this virtual area 3221V, allocates a page 3221R to this virtual area 3221V, registers in the mapping information which page 3221R was allocated to which virtual area 3221V, and writes data to the allocated page 3221R through the DKA 315.

Figure 20B:
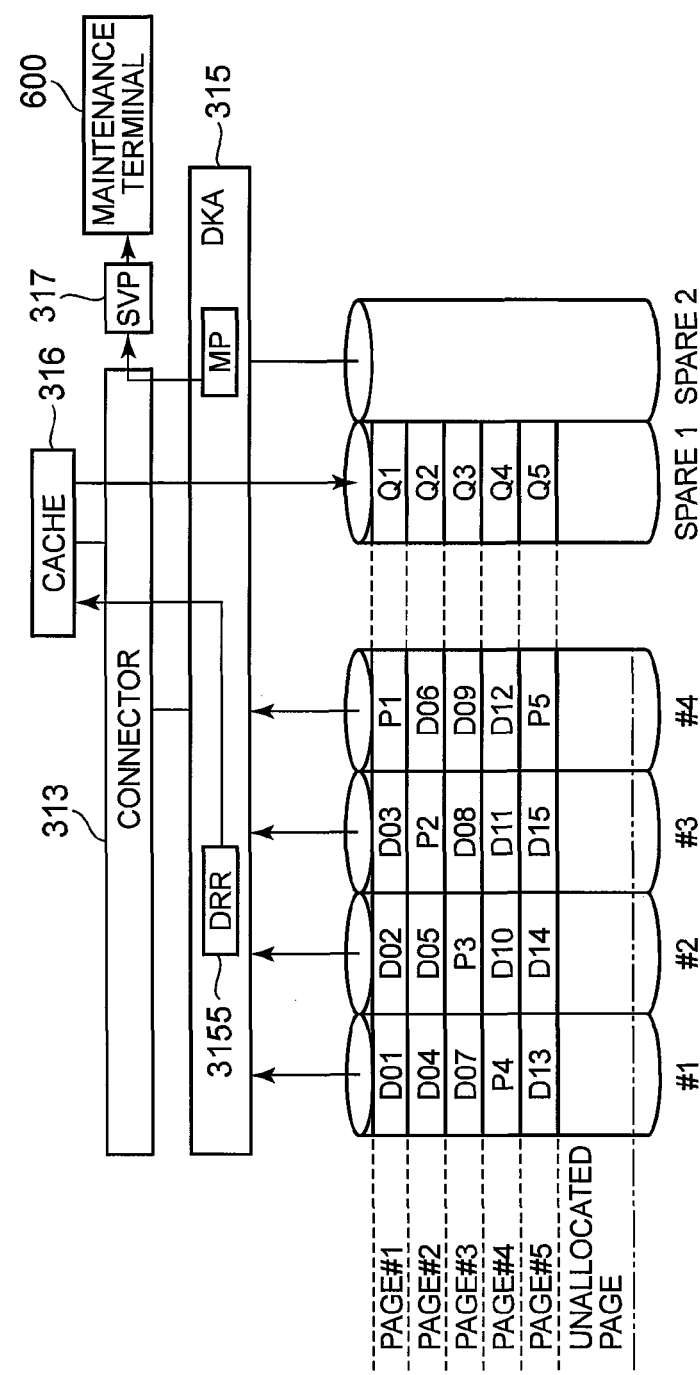
FIG. 20B is a conceptual diagram of parities Q being created for stripes corresponding to allocated pages in the sixth embodiment.

One page, for example, corresponds on a one-to-one basis with one stripe as shown in FIG. 20B. The RAID level control program 31561 specifies which page corresponds one-to-one to which stripe, and acquires a second parity for only the stripe corresponding to the page allocated to the virtual area. In other words, information element read-out and parity Q generation are not carried out for a stripe corresponding to a page, which is not allocated to a virtual area.

Furthermore, the size of a page can be smaller than the size of a stripe, or the page size can be the size of a plurality of stripes. In other words, one stripe can correspond to a plurality of pages, and one page can correspond to a plurality of stripes. In this case, a stripe comprising an allocated page or a plurality of stripes comprising an allocated page are specified, and the reading out of a plurality of information elements from the specified stripe(s) is carried out.

A number of preferred embodiments of the present invention have been explained hereinabove, but these are examples for explaining the present invention, and do not purport to limit the scope of the present invention to these embodiments. The present invention can be put into practice in a variety of other modes.

What is claimed is:

1. A storage system, comprising:
    a plurality of storage devices having not less than two member storage devices which are storage devices provided as members of a RAID group, and either one or a plurality of spare storage devices which are spare storage devices that are not members of the RAID group; and
    a controller for changing a RAID level of the RAID group from a first RAID level to a second RAID level in use of a spare storage device selected from among the either one or a plurality of spare storage devices,
    wherein the second RAID level has higher fault tolerance than the first RAID level, and
    wherein the controller changes the RAID level of the RAID group from the first RAID level to the second RAID level in use of the selected spare storage device when an error rate of a certain member storage device of the not less than two member storage devices exceeds a first threshold.

2. The storage system according to claim 1, wherein
the controller, when the error rate of a certain member storage device of the not less than two member storage devices exceeds a second threshold, carries out an information backup process in which an information element stored in this certain member storage device is written to a separate spare storage device selected from among the plurality of spare storage devices, and wherein the first threshold is lower than the second threshold.

3. The storage system according to claim 2, wherein the controller returns the RAID level of the RAID group from the second RAID level to the first RAID level subsequent to the information backup processing.

4. The storage system according to claim 3, wherein
the controller returns the RAID level of the RAID group from the second RAID level to the first RAID level when the error rate of a member storage device other than the certain member storage device is not more than a prescribed rate, and/or when the error rates of the respective member storage devices are not more than a prescribed rate after passage of a fixed time period.

5. The storage system according to claim 1, wherein
the second RAID level is a RAID level in which at least one parity is created for each stripe which is a storage area constituting the RAID group, and wherein the controller writes an information element stored in the certain member storage device to the selected spare storage device, and writes the parity of each stripe to the certain member storage device.

6. The storage system according to claim 5, wherein the controller returns the RAID level of the RAID group from the second RAID level to the first RAID level by removing the certain member storage device from the RAID group, and managing the selected spare storage device as a member of the RAID group.

7. The storage system according to claim 1, wherein
the second RAID level is a RAID level in which at least one parity is created for each stripe which is a storage area constituting the RAID group, wherein the selected spare storage device is provided in plurality, and the controller distributes a plurality of parities, for a plurality of stripes constituting the RAID group, to the selected plurality of spare storage devices.

8. The storage system according to claim 1, wherein
the second RAID level is a RAID level in which at least one parity is created for each stripe which is a storage area constituting the RAID group, and wherein the controller distributes a plurality of parities, for a plurality of stripes constituting the RAID group, to the selected spare storage device and the not less than two member storage devices.

9. The storage system according to claim 1, wherein changing from the first RAID level to the second RAID level requires reading out information elements from the not less than two member storage devices, for each stripe which is a storage area constituting the RAID group, a logical volume is formed on based a storage space of the RAID group, and the logical volume is constituted from a plurality of pages, which are a plurality of storage areas, and the controller is constituted such that, when a write command received from outside the storage system specifies a virtual storage area in a virtual volume, the controller allocates a selected page from the plurality of pages to the virtual storage area, and writes an information element which conforms to the write command to the allocated page, and in changing from the first RAID level to the second RAID level, the controller reads out an information element only for the stripe corresponding to the page allocated to the virtual logical volume.

10. The storage system according to claim 1, wherein the either one or a plurality of spare storage devices is shared for use with a plurality of RAID groups.

11. The storage system according to claim 1, wherein the controller has a cache memory, and is constituted so as to receive a write command from outside the storage system, write an information element based on this write command to the cache memory, and, in this case, report write-completion to an outside unit, and, asynchronously thereto, write this information element to the RAID group, and if the RAID level of the RAID group is in a process of being changed, the controller holds off on writing the information element stored in the cache memory to the RAID group, and writes this information element to the RAID group subsequent to the completion of the RAID level change.

12. The storage system according to claim 11, wherein
the controller comprises a higher-level I/F, which is an interface device for the outside unit, and a lower-level I/F, which is an interface device for the plurality of storage devices, wherein the higher-level I/F is constituted so as to carry out reception of a write command from the outside unit, writing of an information element based on this write command to the cache memory, and reporting of write-completion to the outside unit, and wherein the lower-level I/F is constituted so as to carry out writing of the information element stored in the cache memory to the RAID group, change of the RAID level of the RAID group, holding off of writing the information element stored in the cache memory to the RAID group if the RAID level is in a process of being changed, and writing of this information element to the RAID group subsequent to completion of the RAID level change.

13. The storage system according to claim 1, wherein the second RAID level is a level in which many more parities are created for each stripe which is a storage area constituting the RAID group than in the first RAID level.

14. The storage system according to claim 13, wherein the controller, when an error rate of a certain member storage device of the not less than two member storage devices exceeds a first threshold, executes, for each stripe constituting the RAID group, read-out of not less than two information elements stored in a stripe, creation of a parity based on the not less than two information elements, and write of the created parity to the selected spare storage device, and the controller changes the RAID level of the RAID group from the first RAID level to the second RAID level by managing the selected spare storage device as another member of the RAID group.

15. The storage system according to claim 14, wherein the controller is constituted such that, when the error rate of a certain member storage device of the not less than two member storage devices exceeds a second threshold, the controller carries out an information backup process for writing an information element stored in this certain member storage device to a separate spare storage device selected from the plurality of spare storage devices, and wherein the first threshold is lower than the second threshold.

16. The storage system according to claim 15, wherein subsequent to the information backup process, the controller returns the RAID level of the RAID group from the second RAID level to the first RAID level by writing the information element stored in the selected separate spare storage device to a post-replacement member storage device, which is the storage device mounted in place of the certain member storage device subsequent to the certain member storage device being removed from the storage system, and by removing the selected spare storage device from the RAID group members.

17. The storage system according to claim 14, wherein the controller returns the RAID level of the RAID group from the second RAID level to the first RAID level by writing the information element stored in the certain member storage device to the selected spare storage device for each stripe constituting the RAID group, writing the parity of each the stripe to the certain member storage device, and removing the certain member storage device from the RAID group.

18. A storage system comprising:
a plurality of storage devices having not less than two member storage devices which are storage devices provided as members of a RAID group, and a spare storage device which is not a member of this RAID group; and
a controller for carrying out an information backup process, which writes an information element stored in a certain member storage device to the spare storage device when an error rate of this certain member storage device of the not less than two member storage devices exceeds a second threshold,
wherein the controller changes a RAID level of the RAID group from a first RAID level to a second RAID level, which features higher fault tolerance than the first RAID level, prior to carrying out the information backup process.

* * * * *